US012056745B2

(12) United States Patent
Chehrazi et al.

(10) Patent No.: US 12,056,745 B2
(45) Date of Patent: Aug. 6, 2024

(54) MACHINE-LEARNING DRIVEN DATA ANALYSIS AND REMINDERS

(71) Applicant: Nayya Health, Inc., New York, NY (US)

(72) Inventors: Sina Chehrazi, New York, NY (US); John Joseph Glorioso, Jr., Laurel, MD (US); Motaz Abdullah Balghonaim, Coquitlam (CA); Edward David Rothschild, Baltimore, MD (US); Akash Magoon, Fallston, MD (US); Aman Magoon, Fallston, MD (US)

(73) Assignee: Nayya Health, Inc., New York, NY (US)

( * ) Notice: Subject to any disclaimer, the term of this patent is extended or adjusted under 35 U.S.C. 154(b) by 0 days.

(21) Appl. No.: 17/472,167

(22) Filed: Sep. 10, 2021

(65) Prior Publication Data

US 2022/0327585 A1 Oct. 13, 2022

Related U.S. Application Data

(60) Provisional application No. 63/174,184, filed on Apr. 13, 2021.

(51) Int. Cl.
*G06Q 30/0282* (2023.01)
*G06Q 30/0204* (2023.01)
*G06Q 40/08* (2012.01)

(52) U.S. Cl.
CPC ..... *G06Q 30/0282* (2013.01); *G06Q 30/0204* (2013.01); *G06Q 40/08* (2013.01)

(58) Field of Classification Search
CPC .......... G06Q 30/0282; G06Q 30/0204; G06Q 40/08; G06Q 50/10; G06N 20/00;
(Continued)

(56) References Cited

U.S. PATENT DOCUMENTS 7,305,347 B1 * 12/2007 Joao ........................ G06Q 40/00
705/35
7,711,660 B1 * 5/2010 Gentile .................. G06Q 40/08
705/2
(Continued)

FOREIGN PATENT DOCUMENTS

CN 109545317 A 3/2019
EP 3401847 A1 11/2018
(Continued)

OTHER PUBLICATIONS

Malhotra et al.; "Machine Learning in Insurance"; Accenture; 2018; pp. 1-13; located at https://www.accenture.com/_acnmedia/pdf-84/accenture-machine-leaning-insurance.pdf (Year: 2018).*
(Continued)

*Primary Examiner* — Lynda Jasmin
*Assistant Examiner* — Kimberly L Evans
(74) *Attorney, Agent, or Firm* — NovoTechIP International PLLC

(57) ABSTRACT

A data processing system for machine-learning driven data analysis and reminders implements obtaining an electronic copy of demographic information and an electronic copy of insurance and benefits information associated with a user; providing the demographic information and the insurance and benefits information to a first machine learning model; analyzing the demographic information and the insurance and benefits information with the first machine learning model to output a first benefits utilization prediction that the one or more benefits are available to the user; providing the first benefits utilization prediction as an input to a recommendation engine; generating, using the recommendation engine, a benefits usage summary recommendation report that presents the information regarding the one or more benefits available to the user based on the first benefits utilization prediction; and causing a user interface of a
(Continued)

display of a computing device to present the benefits usage summary recommendation report.

19 Claims, 22 Drawing Sheets

(58) Field of Classification Search
CPC ........ G16H 10/60; G16H 20/10; G16H 40/20; G16H 50/20
USPC ............... 705/1.1, 2, 4, 3, 5, 35, 41, 46, 26; 706/47; 707/602
See application file for complete search history.

(56) References Cited

U.S. PATENT DOCUMENTS

| | | | |
|---|---|---|---|
| 7,853,459 B2 | 12/2010 | Kay | |
| 8,185,463 B1* | 5/2012 | Ball | G06Q 40/06 705/2 |
| 8,412,537 B1* | 4/2013 | Fenton | G16H 10/60 705/2 |
| 8,712,797 B1 | 4/2014 | Bezdek et al. | |
| 8,930,228 B1 | 1/2015 | Ball | |
| 9,183,593 B2 | 11/2015 | Willis et al. | |
| 9,495,700 B2 | 11/2016 | Hoch et al. | |
| 9,773,094 B1* | 9/2017 | Balagere | G06Q 10/06395 706/46 |
| 10,395,006 B2 | 8/2019 | Brown | |
| 10,402,908 B1 | 9/2019 | Ross et al. | |
| 10,803,528 B2 | 10/2020 | Mdeway | |
| 10,810,223 B2 | 10/2020 | Sundararaman et al. | |
| 10,818,395 B1* | 10/2020 | Khalak | G16H 10/60 706/47 |
| 11,113,770 B1 | 9/2021 | Magoon et al. | |
| 11,120,510 B1* | 9/2021 | Mitchell | G06Q 40/08 705/4 |
| 11,170,450 B1* | 11/2021 | Magoon | G06N 5/04 705/2 |
| 11,244,370 B2 | 2/2022 | Ketchel, III et al. | |
| 11,720,973 B2 | 8/2023 | Chehrazi et al. | |
| 2004/0111302 A1 | 6/2004 | Falk et al. | |
| 2005/0203828 A1* | 9/2005 | Lyakovetsky | G06Q 40/025 705/1.1 |
| 2006/0173715 A1 | 8/2006 | Wang | |
| 2009/0281841 A1 | 11/2009 | Basak et al. | |
| 2009/0287509 A1 | 11/2009 | Basak et al. | |
| 2011/0046985 A1* | 2/2011 | Raheman | G06Q 40/08 705/4 |
| 2013/0046624 A1 | 2/2013 | Calman et al. | |
| 2014/0278495 A1 | 9/2014 | Rourke et al. | |
| 2015/0006206 A1 | 1/2015 | Mdeway | |
| 2015/0046088 A1 | 2/2015 | Jang et al. | |
| 2015/0142479 A1 | 5/2015 | Porter et al. | |
| 2016/0042148 A1 | 2/2016 | Bradley | |
| 2017/0140114 A1 | 5/2017 | Are et al. | |
| 2018/0089379 A1 | 3/2018 | Collins et al. | |
| 2019/0005198 A1 | 1/2019 | Richards et al. | |
| 2019/0042887 A1 | 2/2019 | Nguyen et al. | |
| 2019/0080416 A1* | 3/2019 | Smith | G06Q 40/08 705/4 |
| 2019/0266243 A1* | 8/2019 | Farooq | G16H 10/60 705/3 |
| 2019/0348180 A1 | 11/2019 | Sharifi Sedeh | |
| 2019/0384849 A1* | 12/2019 | Sundararaman | G16H 30/20 707/602 |
| 2020/0020038 A1 | 1/2020 | Haile et al. | |
| 2020/0043070 A1 | 2/2020 | Ketchel et al. | |
| 2020/0096353 A1 | 3/2020 | Misaki et al. | |
| 2020/0105392 A1 | 4/2020 | Karkazis et al. | |
| 2020/0279025 A1 | 9/2020 | Owen | |
| 2020/0364797 A1 | 11/2020 | Halpern-Manners et al. | |
| 2020/0410601 A1 | 12/2020 | Laumeyer et al. | |
| 2021/0035224 A1* | 2/2021 | Crabtree | G06Q 30/0611 705/41 |
| 2021/0035225 A1 | 2/2021 | Simpson et al. | |
| 2021/0065862 A1 | 3/2021 | Siegel | |
| 2021/0074401 A1 | 3/2021 | Bezdek et al. | |
| 2021/0103829 A1 | 4/2021 | Barshan et al. | |
| 2021/0210185 A1 | 7/2021 | Allred et al. | |
| 2021/0312515 A1 | 10/2021 | Ketchel, III et al. | |
| 2022/0012766 A1 | 1/2022 | Hinton, II | |
| 2022/0019913 A1 | 1/2022 | Ayyadevara et al. | |
| 2022/0094699 A1 | 3/2022 | Birur | |
| 2022/0101162 A1 | 3/2022 | Palacios et al. | |
| 2022/0327584 A1 | 10/2022 | Magoon et al. | |
| 2022/0366474 A1* | 11/2022 | Kuhn | G06Q 30/0631 705/26 |
| 2023/0334590 A1 | 10/2023 | Chehrazi et al. | |
| 2023/0410211 A1 | 12/2023 | Chehrazi et al. | |

FOREIGN PATENT DOCUMENTS

| | | | | |
|---|---|---|---|---|
| WO | WO-2005076957 A2 * | 8/2005 | | G06F 19/328 |
| WO | 2008057761 A2 | 5/2008 | | |
| WO | 2014209517 A1 | 12/2014 | | |
| WO | WO-2015024251 A1 * | 2/2015 | | G06Q 40/08 |
| WO | WO-2016138102 A1 * | 9/2016 | | G06F 17/30867 |
| WO | 2018156942 A1 | 8/2018 | | |
| WO | 2018166853 A1 | 9/2018 | | |

OTHER PUBLICATIONS

International Search Report and Written Opinion for PCT/US2022/023512 dated Jul. 13, 2022, 10 pages.
Sahu et al.; "Automating claims adjudication workflows using Amazon Textract and Amazon Comprehend Medical"; AWS for Industries; Nov. 19, 2019; pp. 1-11; located at https://aws.amazon.com/blogs/industries/automating-claims-adjudic.ation-workflows-using-amazon-textract-and-amazon-comprehend-medical/.
International Search Report and Written Opinion for PCT/US2022/023499 dated Jul. 18, 2022, 11 pages.
Notice of Allowance issued Mar. 20, 2023 in corresponding U.S. Appl. No. 17/401,596.
Notice of Allowance issued Jun. 17, 2021 in corresponding U.S. Appl. No. 17/229,020.
Non-Final Office Action issued Jan. 31, 2022 in corresponding U.S. Appl. No. 17/472,029.
Final Office Action issued Jun. 7, 2022 in corresponding U.S. Appl. No. 17/472,029.
Non-Final Office Action issued Jan. 26, 2023 in corresponding U.S. Appl. No. 17/472,029.
Final Office Action issued Sep. 7, 2023 in corresponding U.S. Appl. No. 17/472,029.
International Search Report and Written Opinion for PCT/US2022/023502 dated Jul. 15, 2022, 10 pages.

* cited by examiner

AllInsurance

Where would you like us to send your security code?

○ Text  XXX-XXX-5525

○ Email  tr......@gmail.com

Cancel  Continue

AllInsurance

Please verify the security code that was sent to xxx-xxx-5525:

6  1  3  3

Cancel    Verify

Success

You can now access your policy information and claims for your AllInsurace policy.

[ Close ]

Insurance Dashboard

Welcome,
Anna
Member since 3/3/21

| Today's Potential Savings | Your Lifetime Savings |
|---|---|
| $247 | $127 |

The more actions you complete from the notifications below, the more you save!

---

Save up to $123 — Anna
per year on your Tier I prescription drug Promethazine if you go to an alternative pharmacy nearby.  [Save Now]

Save up to $247 — Jeff
by submitting your urgent care claim dated October 27, 2020 to Allied Insurance.  [Save Now]

Save up to $110 — Jeff
per visit by changing to an in-network doctor for your recurring podiatry visits.  [Save Now]

Save up to $55 — Anna
per visit by changing to an in-network doctor for your recurring orthopaedic specialist visits.  [Save Now]

[Browse >]

---

My Spending Overview

Medical
Total Deductible $6250    Deadline 12/14/2021
Total Deductible $1265.24    Remaining $4984.76
[20%]
You have not reached the deductible or out-of-pocket maximum.
View my medical plan

Pharmacy
Total Spent on Prescriptions $68.92    Total of Active Prescriptions 5
Find affordable prescriptions

Dental
Annual Benefit Limit $2500    Deductible $40 per person
Total Spend $2500 $400.57    Remaining $2459.43
[25%]
You have not reached the deductible or out-of-pocket maximum.
View my cards and plans

FIG. 6A

Prescription Savings Opportunity

Save up to  Anna
$123  per year on your Tier I prescription drug Promethazine if you go to an alternative pharmacy nearby.

ABC Pharmacy offers your Promethathazine prescription for $6.25 per month. You currently pay $16.50 per month at XYZ Pharmacy.

Switching your prescription to ABC Pharmacy will save you $10.25 per month for a total of $123 per year.

The closest location of ABC Pharmacy is 3.5 miles from your home at:

1414 Canon Landing Parkway, Fairfax, Virginia 22030

To switch your prescription to ABC Pharmacy, call 1-888-333-5555 and provide your prescription information. You may also submit a request online by clicking here and we will guide you through the process of submitting the request.

< Back    Next >

FIG. 6B

Out-of-Network Visits

Save up to  Jeff
$110  per visit by changing to an in-network doctor for your recurring podiatry visits.

Your have 3 podiatry visits in the past 12 months with Dr. Lara Krishnamuthy. Dr. Krishnamurthy is not in network for medical insurance.

Switching your prescription to one of the following in network podiatrists could save you up to $110 per visit:

Dr. Melvin Silverstein – Fairfax Medical Group, 1122 Main St., Suite 202, Fairfax, VA 21051.
(4 miles from your home)

Dr. Kara Ford – Fairfax Medical Group, 1122 Main St., Suite 202, Fairfax, VA 21051.
(4 miles from your home)

Dr. Ravi Kumar – NoVA Medical Group, 344 Medical Parkway, Suite 101A, Fairfax, VA 21051.
(8 miles from your home)

Dr. Melinda Chu – NoVA Medical Group, 344 Medical Parkway, Suite 101A, Fairfax, VA 21051.
(8 miles from your home)

< Back     Next >

Health Saving Account Activity Report

You saved    In the month of March you added $75 to your Health Savings Account

$75

You current Health Savings Account balance is $335.50.

You have not yet reached the deductible for your Medical Insurance. We recommend continuing to fund you Health Savings Account at the rate of $75 per month to cover out of pocket medical expenses before your deductible has been met.

The money that you deposit into your Health Savings Account may be tax deductible.

< Back    Next >

Claims Activity Report – How much are you responsible for paying?

You owe
$165

In the month of March you have two claims for which you are responsible for paying at least a portion of the claim amount. The list below provides details of what you own and can guide you through how to pay the amount due for each of these claims.

Amount due  <u>Jeff</u>  for visit on 3/6/21 to Dr. Lara Krishnamuthy, an out of network
$110  doctor for your recurring podiatry visits.

[ Make Payment ]

Amount due  <u>Anna</u>  for visit on 3/12/21 to Dr. Charles Thompson, an out of network
$55  doctor for your recurring podiatry visits.

[ Make Payment ]

[ < Back ]    [ Next > ]

Benefits Reminders

Don't forget that you have the following benefits to you. Many of these are at no cost to you and can help you maintain your health and well being.

$0 Cost — <u>Anna</u> Don't forget to schedule your annual mammogram screening at no cost to you at an in-network provider. Please for more information for scheduling your screening. [Show Me]

$0 Cost — <u>Jeff</u> Don't forget to schedule your annual physical at no cost to you at an in-network provider. Please for more information for scheduling your screening. [Show Me]

$20 per month — <u>Anna</u> Your health plan provides discounted health club membership for you and your family. You can get membership for your entire family for the discounted rate of just $20 per month. [Show Me]

[< Back]  [Next >]

Benefits Usage Summary for March 2021

Anna, we have put together a summary of your benefits usage for the month of March 2021. The report provides you details of the savings you (1) Prescription – Promethathazine for Anna You spent $16.50 on the Promethathazine prescription for Anna. We recommend that you switch your prescription to ABC Pharmacy to reduce your prescription cost to $6.25 per month for a savings of $10.25 per month and $123 annually.

(2) Podiatry Specialist for Jeff

You had a visit on 3/6/21 to Dr. Lara Krishnamuthy, an out of network doctor for your recurring podiatry visits. Consider selecting an in-network doctor to save at least $110.

(3) Orthopedic Specialist for Anna

You had a visit on 3/12/21 to Dr. Charles Thompson, an out of network doctor for your recurring podiatry visits. Consider selecting an in-network doctor to save at least $55.

< Back    Next >

FIG. 6G

MACHINE-LEARNING DRIVEN DATA ANALYSIS AND REMINDERS

CROSS-REFERENCE TO RELATED APPLICATIONS

This application claims the benefit of priority from U.S. Provisional Patent Application Ser. No. 63/174,184, filed on Apr. 13, 2021, and entitled "Machine-Learning Driven Data Analysis and Reminders."

BACKGROUND

Many insured people underutilize their insurance and benefits because they are unaware of and/or forget to use all the coverage provided thereby. An insurance and benefits plan may include multiple types of insurance policies which provide coverage for various types of claims, such as but not limited to medical insurance, dental insurance, accident insurance, hospital indemnity insurance, and auto insurance. Each of these policies may cover a variety of different types of claims, and the insured may not have a complete understanding of the minutiae of the coverage provided by each of the policies. Furthermore, each of the policies may provide preventative benefits, such as but not limited to periodic physical health examinations, periodic dental examinations and cleanings, and discounts of health club memberships. These and other benefits may go unused if an insured person is unaware of or forgets to utilize these benefits. Hence, there is a need for improved systems and methods that provide a technical solution for solving the technical problem of automatically analyzing the insurance and benefits available to a user and providing recommendations to assist the user in utilizing the available benefits.

SUMMARY

An example data processing system according to the disclosure may include a processor and a computer-readable medium storing executable instructions. The instructions when executed cause the processor to perform operations including obtaining an electronic copy of demographic information associated with a user; obtaining an electronic copy of insurance and benefits information for insurance and benefits associated with the user, wherein the insurance and benefits information includes policy information identifying benefits provided by one or more insurance policies and claims information indicating one or more insurance claims filed on behalf of the user; providing the demographic information and the insurance and benefits information to a first machine learning model; analyzing the demographic information and the insurance and benefits information with the first machine learning model to output a first benefits utilization prediction, wherein the first machine learning model is configured to analyze the demographic information and the insurance and benefits information associated with the user and to output a prediction that the one or more benefits are available to the user; providing the first benefits utilization prediction as an input to a recommendation engine; generating, using the recommendation engine, a benefits usage summary recommendation report that presents the information regarding the one or more benefits available to the user based on the first benefits utilization prediction; and causing a user interface of a display of a computing device associated with the user to present the benefits usage summary recommendation report.

An example method implemented in a data processing system for machine-learning driven data analysis and reminders includes obtaining an electronic copy of demographic information associated with a user; obtaining an electronic copy of insurance and benefits information for insurance and benefits associated with the user, wherein the insurance and benefits information includes policy information identifying benefits provided by one or more insurance policies and claims information indicating one or more insurance claims filed on behalf of the user; providing the demographic information and the insurance and benefits information to a first machine learning model; analyzing the demographic information and the insurance and benefits information with the first machine learning model to output a first benefits utilization prediction, wherein the first machine learning model is configured to analyze the demographic information and the insurance and benefits information associated with the user and to output a prediction that the one or more benefits are available to the user; providing the first benefits utilization prediction as an input to a recommendation engine; generating, using the recommendation engine. a benefits usage summary recommendation report that presents the information regarding the one or more benefits available to the user based on the first benefits utilization prediction; and causing a user interface of a display of a computing device associated with the user to present the benefits usage summary recommendation report.

An example machine-readable storage medium according to the disclosure on which are stored instructions which when executed cause a processor of a programmable device to perform operations of obtaining an electronic copy of demographic information associated with a user; obtaining an electronic copy of insurance and benefits information for insurance and benefits associated with the user, wherein the insurance and benefits information includes policy information identifying benefits provided by one or more insurance policies and claims information indicating one or more insurance claims filed on behalf of the user; providing the demographic information and the insurance and benefits information to a first machine learning model; analyzing the demographic information and the insurance and benefits information with the first machine learning model to output a first benefits utilization prediction, wherein the first machine learning model is configured to analyze the demographic information and the insurance and benefits information associated with the user and to output a prediction that the one or more benefits are available to the user; providing the first benefits utilization prediction as an input to a recommendation engine; generating, using the recommendation engine, a benefits usage summary recommendation report that presents the information regarding the one or more benefits available to the user based on the first benefits utilization prediction; and causing a user interface of a display of a computing device associated with the user to present the benefits usage summary recommendation report.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A, 5B, 5C, 5D, 5E, 5F, 5G, and 5H show an example user interface for linking a CAAS account to an insurer account.

FIGS. 6A, 6B, 6C, 6D, 6E, 6F, and 6G show an example user interface for presenting information for assisting a user to utilizing available benefits.

DETAILED DESCRIPTION

Figure 1:
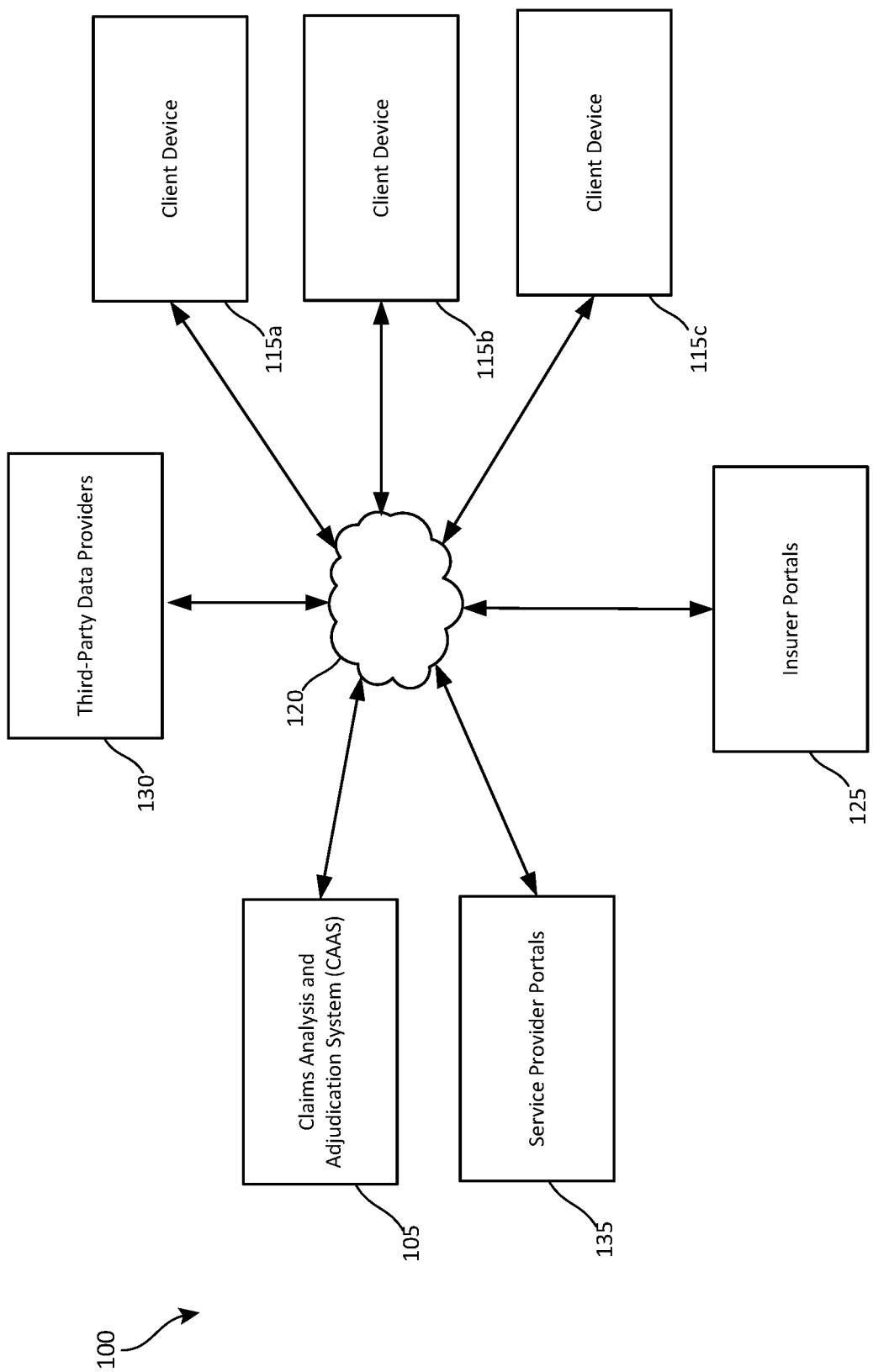
FIG. 1 is a diagram showing an example computing environment in which the techniques disclosed herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques are described herein for machine-learning driven recommendations and reminders to an insured user for optimizing the usage of the benefits provided by the user's insurance plan. An insurance plan may include a bundle of insurance policies that each have a complex list of the types of claims that the insurer may cover and the coverage limitations that provide the conditions under which the insurer may cover such claims. The policies may provide various benefits to the user that may be no cost or low-cost to the user. The no cost and/or low-cost benefits may be preventative in nature and promote the health and well-being of the user. The techniques provided herein provide a technical solution for identifying benefits that the user may have left unutilized or underutilized by analyzing policy information, insurance consumption information, and user demographic information to provide recommendations for the user for utilizing various benefits associated with their insurance plan. A technical benefit of this approach is that the machine learning models may recognize patterns in the policy information, the insurance consumption, and the demographic information of the user to recommend benefits utilization that may not otherwise be evident to a user and/or may be overlooked by the user. These techniques may not only identify benefits that the user may utilize to maintain their health and well-being but also provide recommendations where the user may save on medical spending. Another technical benefit provided by the techniques described herein is that the machine learning models may be trained using data that has been parsed and standardized into a standard schema. Furthermore, the data to be analyzed by the machine learning models may also be parsed and standardized. As a result, the machine learning models are receiving data in a format that utilizes descriptions that are consistent with the training data used to train the models. Consequently, the predictions provided by the models may be significantly improved in comparison to models which are not trained using such a technique. The techniques provided herein also provide for substantially real-time analysis of information from a combination of data sources that may also significantly improve the predictions provided by the machine learning models and provide the user with recommendations that are more likely to provide for the user's needs. These and other technical benefits of the techniques disclosed herein will be evident from the discussion of the example implementations that follow. Furthermore, the techniques provided herein satisfy a long-felt need for improving the utilization of benefits available to users. Due to the complexity of the various policies available to the user, the user may often overlook or fail to completely utilize the benefits available to them. The solution provided herein provides substantially real-time analysis of the user's benefits, the user's utilization of these benefits, and other user-related data to provide recommendations to the user for utilizing their available benefits.

FIG. 1 is a diagram showing an example computing environment 100 in which the techniques disclosed herein for insurance claims analysis and adjudication may be implemented. The computing environment 100 may include a claims analysis and adjudication system (CAAS) 105, one or more client devices 115, one or more insurer portals 125, one or more provider portals 135, and one or more third-party data providers 130. The example implementations shown in FIG. 1 include three client devices 115*a*, 115*b*, and 115*c*, but the techniques described herein may be used with a different number of client devices 115. The client devices 115*a*, 115*b*, and 115*c* may communicate with the CAAS 105, the insurer portals 125, service provider portals 135, and/or the third-party data providers via the network 120. The CAAS 105 may also communicate with the client devices 115*a*, 115*b*, and 115*c*, the insurer portals 125, the service provider portals 135, and/or the third-party data providers 130 via the network 120. The network 120 may include one or more wired and/or wireless public networks, private networks, or a combination thereof. The network 120 may be implemented at least in part by the Internet.

The client devices 115*a*, 115*b*, and 115*c* may be used by an insured to access the services provided by the CAAS 105, insurance information from the insurer portals 125, and/or information from the third-party data providers 130. The client devices 115*a*, 115*b*, and 115*c* are each a computing device that may be implemented as a portable electronic device, such as a mobile phone, a tablet computer, a laptop computer, a portable digital assistant device, a portable game console, and/or other such devices. The client devices 115*a*, 115*b*, and 115*c* may also be implemented in computing devices having other form factors, such as a desktop computer, vehicle onboard computing system, a kiosk, a point-of-sale system, a video game console, and/or other types of computing devices. While the example implementation illustrated in FIG. 1 includes three client devices, other implementations may include a different number of client devices. The client devices 115*a*, 115*b*, and 115*c* may be used to access the applications and/or services provided by the insurer portals 125 and/or the CAAS 105.

The insurer portals 125 may be supplied by insurance providers as a means for insured users to access their policy information, make policy payments, obtain new policies, to submit claims on existing policies, and/or perform other actions related to the managing the insured's insurance. An insured user may have policies with multiple insurers, and thus, may have to access multiple insurer portals 125 to obtain information related to each of their insurance policies. Consequently, the insured user must learn to navigate multiple insurance portals that may have significantly different layouts in order to access their policy information, submit claims and/or check on claim status, or perform other actions related to their policy.

The service provider portals 135 may provide a means for doctors, dentists, optometrists, and/or other medical professionals to submit claims to the insurers on behalf of an insured user. The service provider portals 135 may provide means for the providers to check on the status of a claim with an insurer. The service provider portals 135 may also permit the providers to amend and/or resubmit claims.

The CAAS 105 provides a cloud-based or network-based portal for accessing the services provided by the CAAS 105. The CAAS 105 may be configured to provide secure and delegated access to insurance claims for insured users. The CAAS 105 may implement a claims application programming interface (API) infrastructure that allows the insured users to access their insurance claims data and to provide various services such as claims analysis and adjudication services, guidance for optimizing prescription benefits, guidance for optimizing medical spending account (MSA) usage, guidance for proactive benefits engagement, services which may assist the insured in selecting a bundle of insurance products that satisfies the insured requirements, and/or other services related to optimizing the insurance coverage and utilization by the insured. Among the services provided by the CAAS 105, the CAAS 105 provides substantially real-time claims analysis and adjudication. The CAAS 105 may utilize a machine-learning model or models trained to analyze the claims to guide the user through submitting the claims to the appropriate insurer and to provide other advice for optimizing the use of the coverage provided to the user by their policies. The CAAS 105 may also respond to changes in the demographic data of the user and may provide a proposed bundle of insurance policies that meet the changing needs of the user. The example implementations which follow provide additional details describing these and other features of the CAAS 105.

The CAAS 105 may be configured to collect policy and claims information for users from the insurer portals 125, to analyze the information included in the policy information to obtain coverage information. The coverage information may include which types of claims are covered by each policy, the limits of coverage provided by each policy, other information that may be used to determine whether an insurer may cover a particular claim, or a combination thereof. The CAAS 105 may be configured to implement a set of secure and authenticated pipelines that are configured to allow members to link to their accounts with their insurance providers to obtain plan information, claims information, or both. The CAAS 105 may provide a user interface that provides a list of supported insurers. The user may select an insurer from the list of supported insurers and the user interface guides the user through setting up the connection with the user's account with that insurer. The user may securely provide authentication details that permit the CAAS 105 to securely access the policy information and/or claims information provided through the insurer portals 125. The CAAS 105 may access the policy information, claims information, or both, analyze this information, and convert the information to a unified and standardized schema for this information. The standardized information may be stored by the CAAS 105 to provide various services to user, which will be discussed in greater detail with respect to the example implementation of the CAAS 105 shown in FIGS. 2 and 3.

The third-party data providers 130 are additional data sources that may be accessed by the CAAS 105 to obtain additional information for a user. The CAAS 105 may be configured to use the third-party data to supplement information collected from the user. The CAAS 105 may be configured to collect at least some demographic information from the user by presenting a set of dynamically generated questions to the user. The questions presented to the user may be dynamically selected based at least in part on the user's responses to previous questions, to information included in the third-party data, or a combination thereof. The third-party information and/or information that may be collected from the user may include, but is not limited to, the user's medical history, past insurance consumption, the user's financial profile (debts, assets, liabilities), credit history, family information, psychographics, interests, occupation, salary, physical activity, and other information that may be used by the CAAS 105 to facilitate providing insurance plan recommendations to the user. The CAAS 105 may query the third-party data providers 130 for information and may reformat the data into a standard schema used by the CAAS 105 for storing and analyzing the data. The CAAS 105 may also be configured to disambiguate the data received from the third-party data sources where the data includes information associated with multiple people who may or may not be the user. Additional details of data disambiguation are provided in the examples which follow.

Figure 5A:
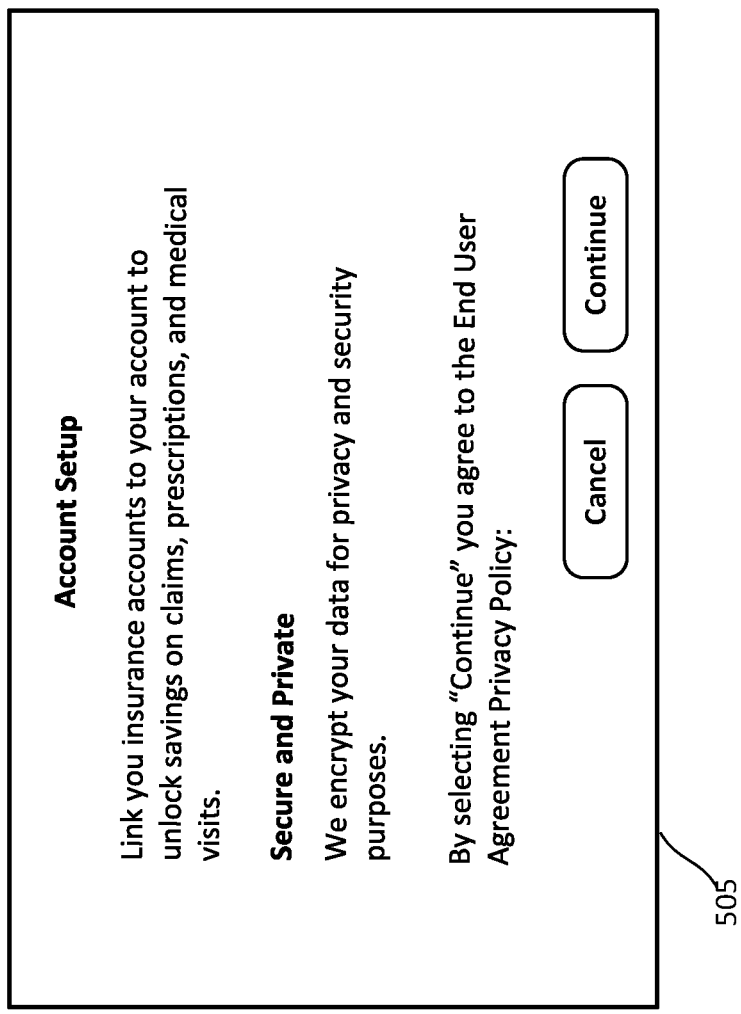
Figure 5B:
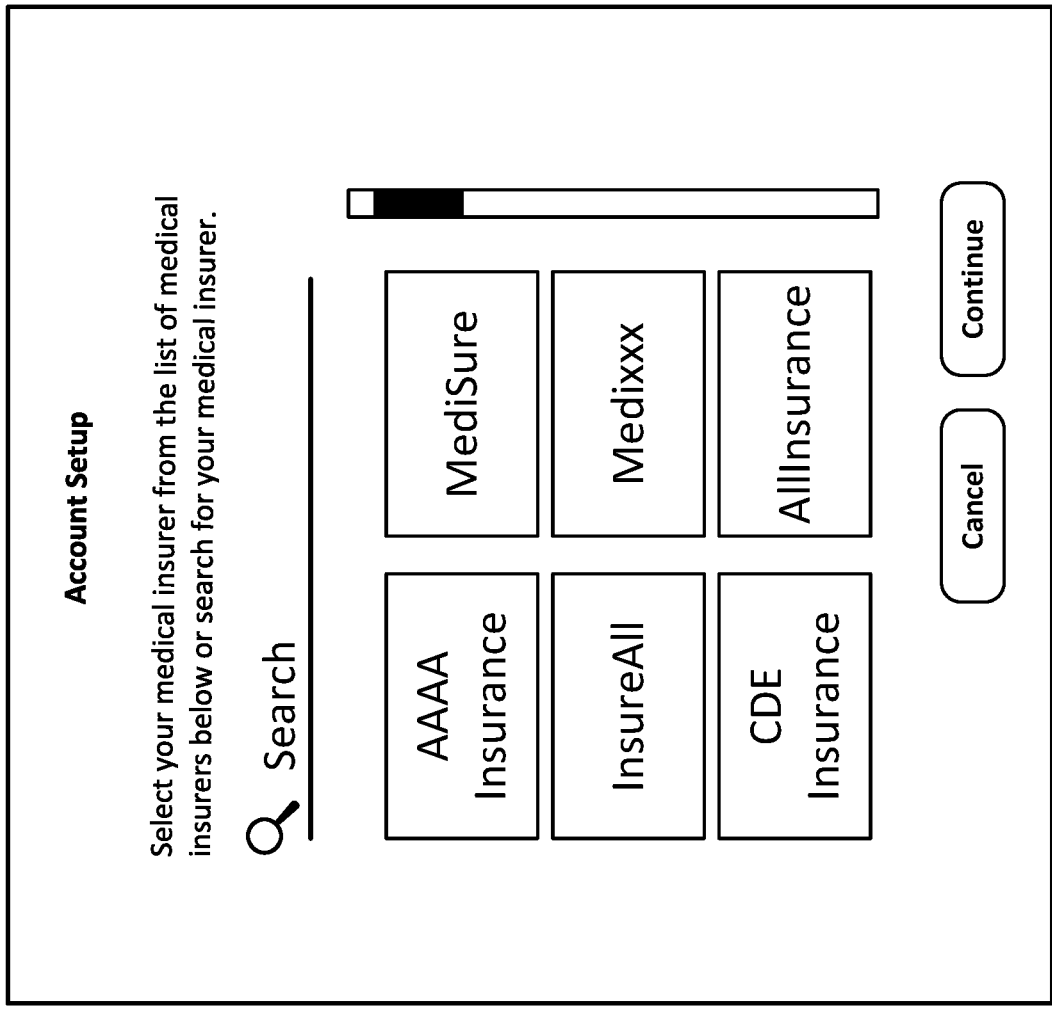
Figure 5C:
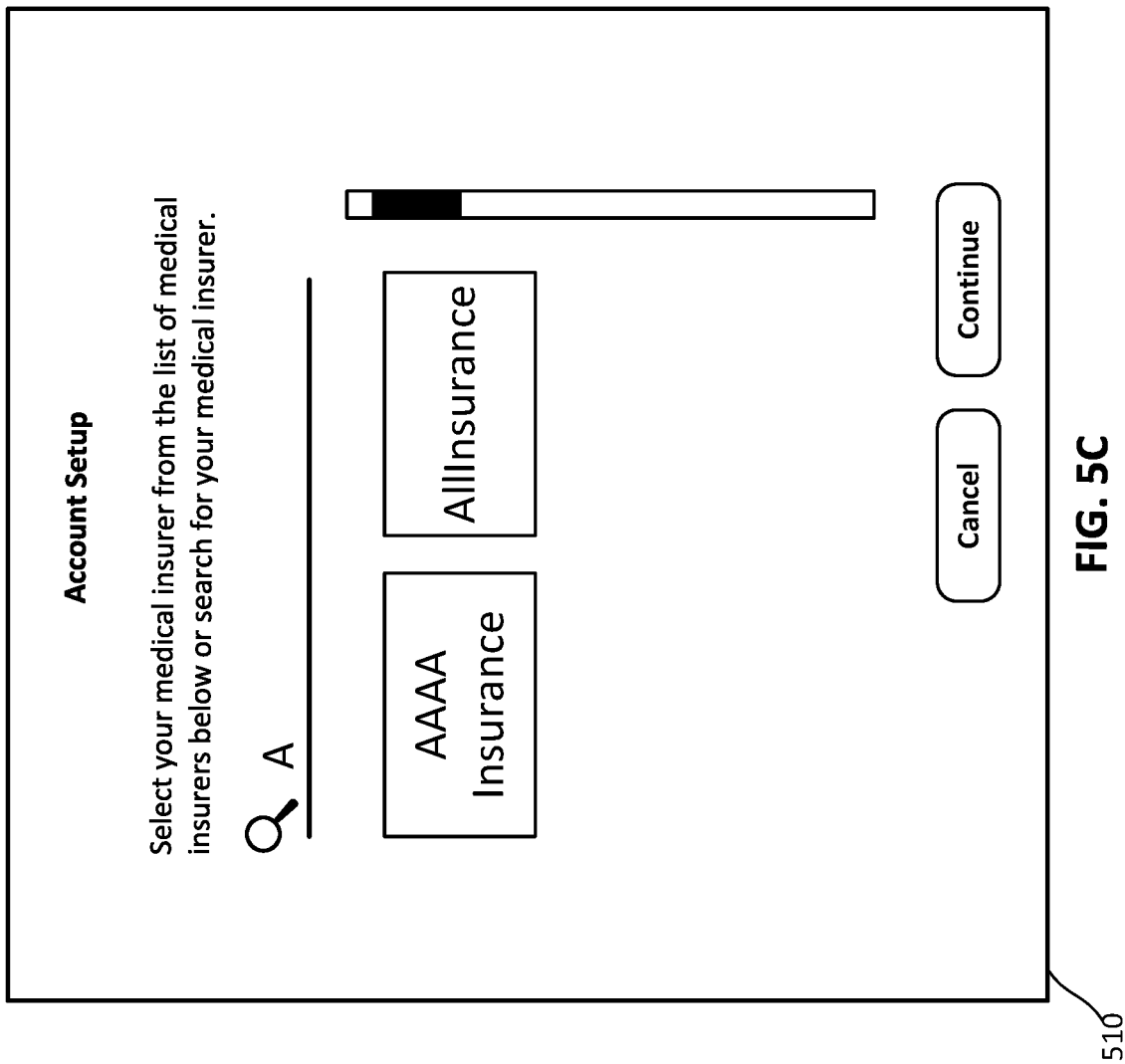
Figure 5D:
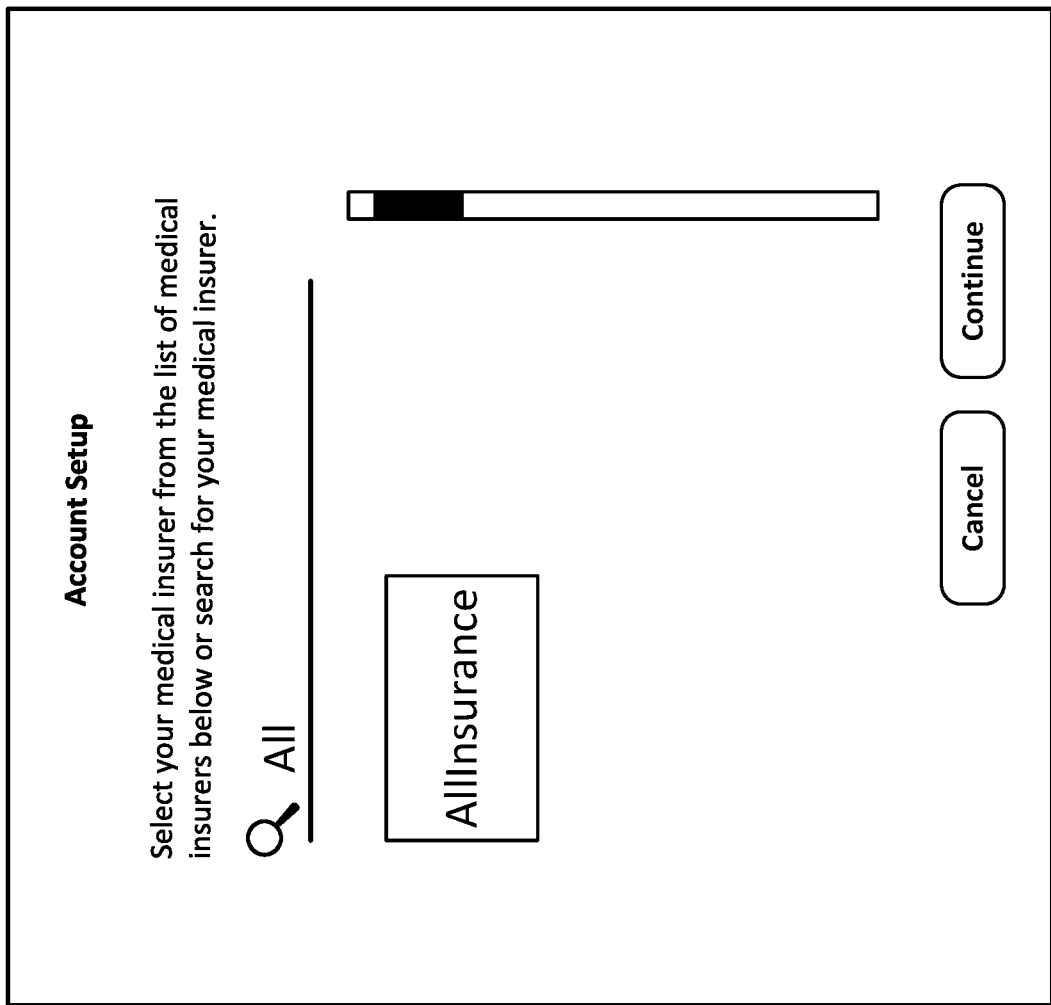
Figure 5E:
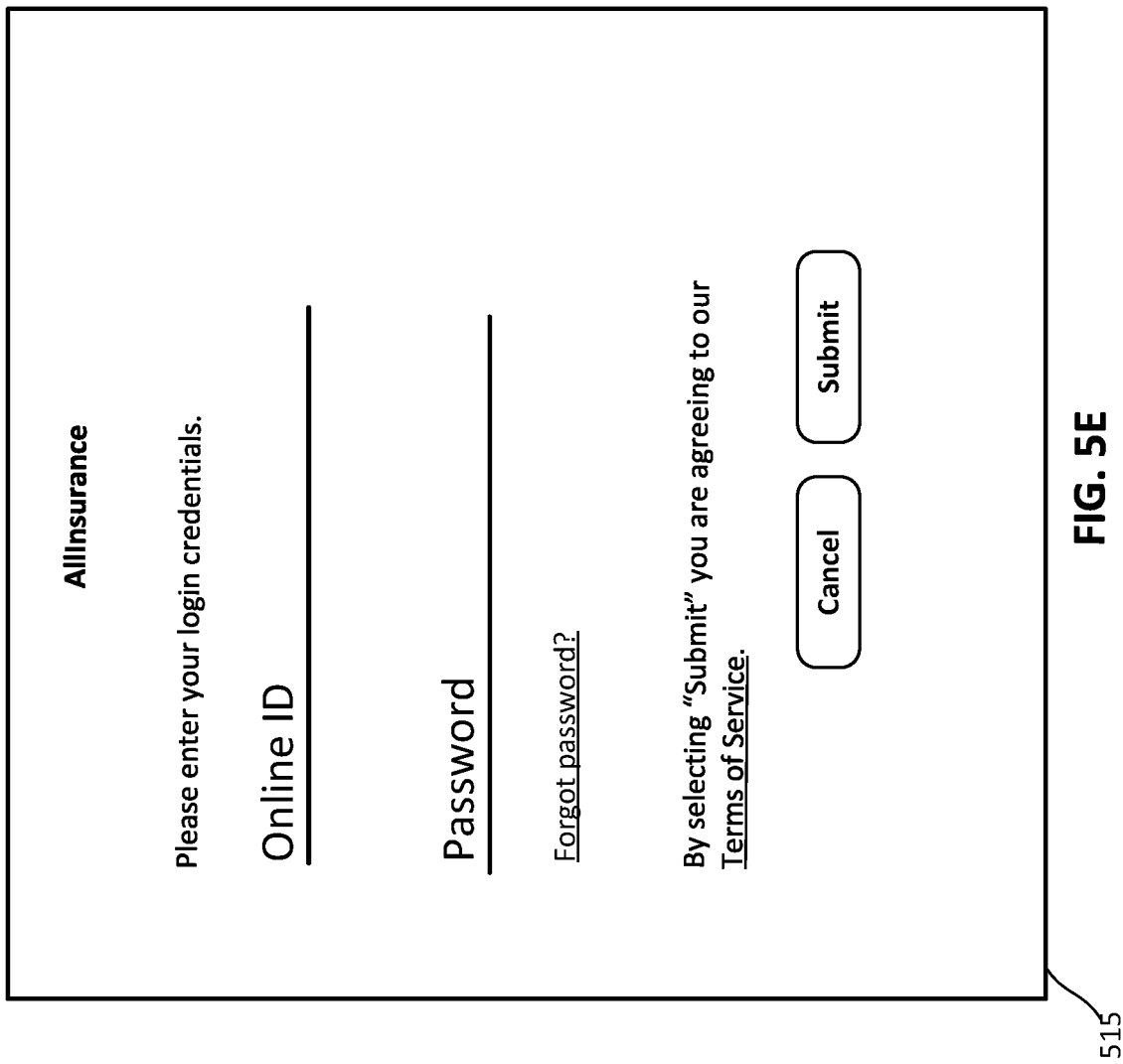

FIGS. 5A-5H show an example of the CAAS 105 guiding a user through the process of linking the user's account with an insurer to the user's CAAS account so that the CAAS 105 may obtain policy and claim information associated with the user from the insurer portal 125. FIG. 5A shows a user interface 505 for starting the setup process that presents information to the user regarding the account setup process. The user may click on the "Continue" button to cause the CAAS 105 to advance to the user interface 510 shown in FIG. 5B. The user interface 510 provides a list of insurers to which the CAAS 105 has been configured to permit the user to link the CAAS account to the user's account on the insurer's system. The user may select the icon associated with a particular insurer or type the name of the insurer in the search field. FIGS. 5C and 5D show that the list of insurers may be narrowed dynamically as the user types in the search field. FIG. 5E shows an example of a user interface 515 that may be displayed for the selected insurer. The user may provide their authentication credentials for the insurer portal and click submit. The CAAS 105 will attempt to access the insurer portal 125 using the provided authentication criteria. FIGS. 5F and 5G show an example two-factor authentication user interface 520 that may be used to further secure access to the user account on the insurer portal 125. Once the user has been authenticated with the insurer's portal, the user interface 525 may be displayed to confirm that the accounts have been linked. The CAAS 105 may then access claims information, policy information, and/or other information from the insurer portal 125.

Figure 2:
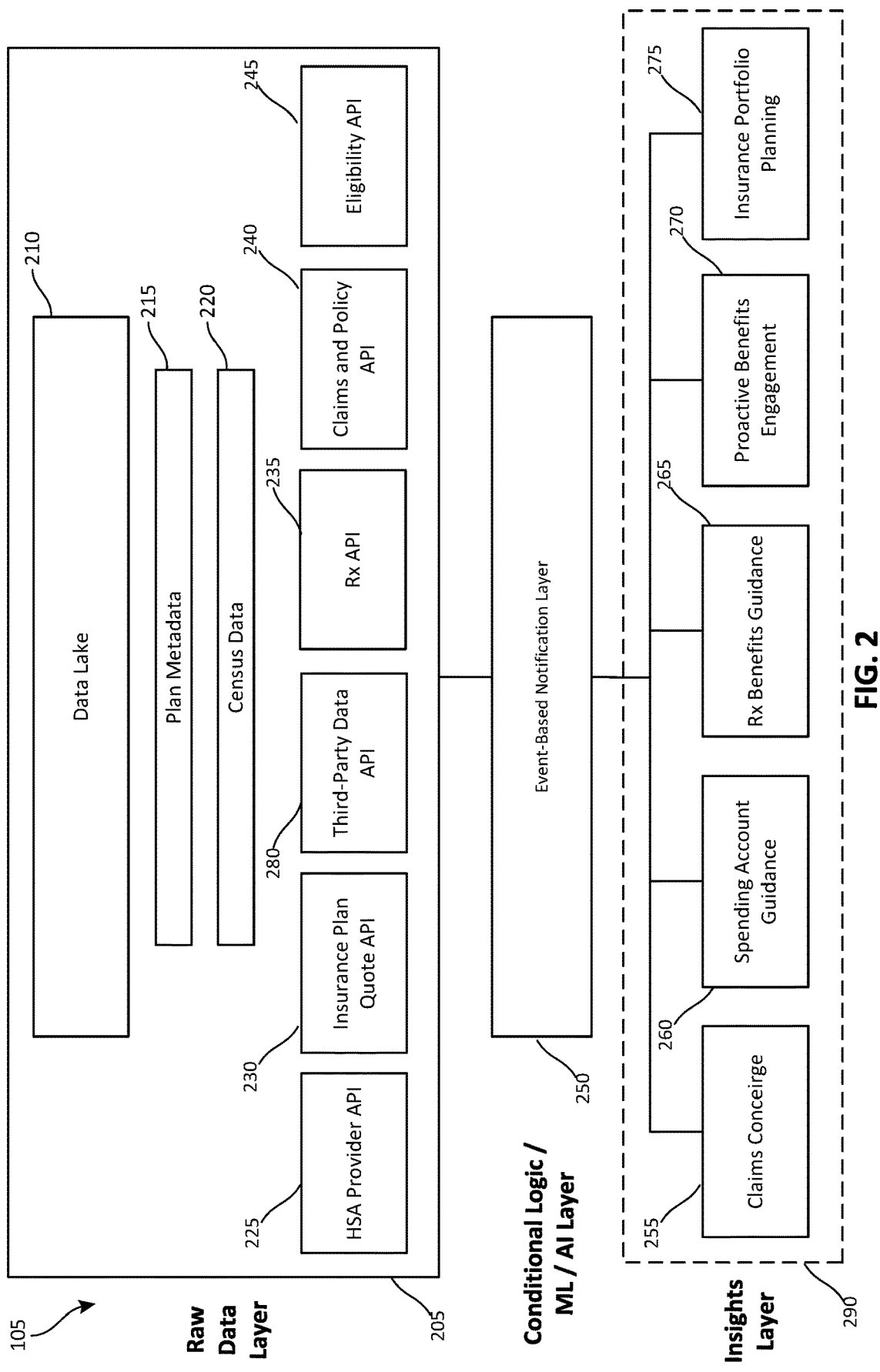
FIG. 2 is a diagram of an example architecture that may be used, at least in part, to implement the claims analysis and adjudication system (CAAS) shown in FIG. 1.

FIG. 2 is a diagram of an example implementation of a CAAS 105 shown in FIG. 1 that shows additional elements of the CAAS 105. The CAAS 105 shown in FIG. 2 includes three layers: (1) a raw data layer 205, (2) an event-based notification layer 250, and (3) an insights layer 290. The raw data layer 205 may be configured to obtain insurance data for users from various data sources, to convert this data to a unified and standardized schema, and to store the user data for analysis by the event-based notification layer 250 and/or the insights layer 290 to provide various insurance-related services to the users. Additional details of the functions of each of these layers will be described in greater detail in the examples which follow. In some implementations, the functions of each of these layers may be grouped together into a different number of functional layers. Furthermore, the functionality of each of the layers may be implemented on separate servers in some implementations, and the servers may be communicably coupled over public and/or private network connections to permit the various components of the CAAS 105 to exchange and analyze data.

The raw data layer 205 may include a data lake 210, a plan metadata data store 215, a census data datastore 220, a health savings account (HSA) provider API 225, an insurance plan quote API 230, a prescription API 235, a claims and policy API 240, an eligibility API 245, and a third-party data API 280. The APIs provide pipelines for obtaining data that that the CAAS 105 may use to provide various insurance-related services. User data may be protected by secure and authenticated pipelines when accessing sensitive data. The CAAS 105 may guide a user through setting up authentication with the external data sources to allow the CAAS 105 to securely access the user data.

Figure 3:
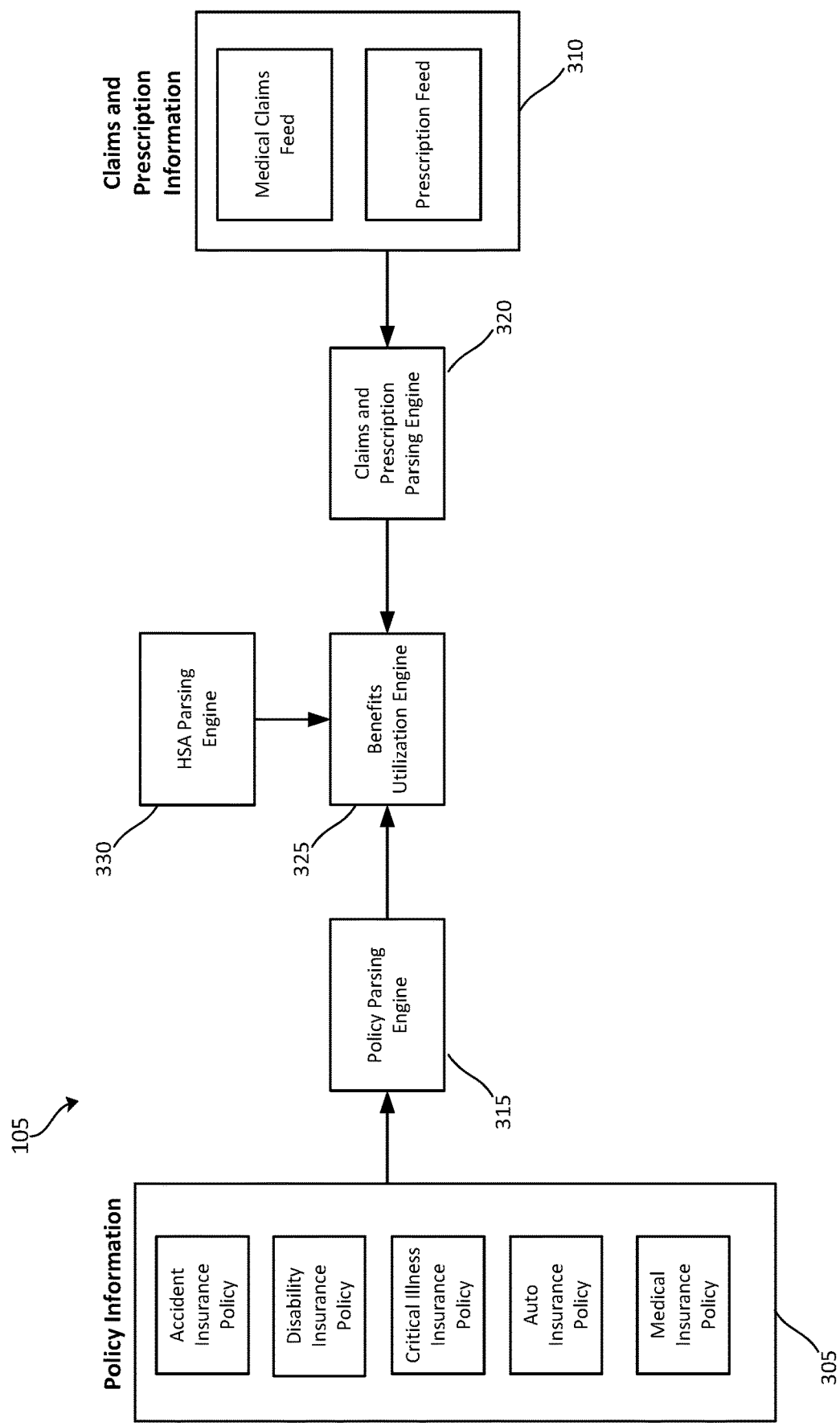
FIG. 3 is a diagram of an example architecture that shows additional details of a CAAS which may be used to implement the CAAS shown in FIGS. 1 and 2.

The data lake 210 may be used to store raw user data, raw claims data, and raw policy data that has been obtained from one or more external data sources, such as but not limited to the insurer portals 125 and the third-party data providers 130. Raw data, as used herein, refers to an original data format in which the data was obtained from the external data source. The format of the raw data may depend on the type of data and the external data source from which the data was obtained. The raw data may be retained in the data lake 210, and the raw data 210 may be processed into a standard schema by one or more parsing engines of the CAAS 205. The standard schema defines a set of logical data structures that may be used by the CAAS 205 storing and analyzing data. FIG. 3, which will be discussed in greater detail below, includes three parsing engines, a policy parsing engine 315, a claims and prescription parsing engine 320, and an HSA parsing engine 330 for parsing data. While the example shown in FIG. 3 includes three separate parsing engines, the functionality of the parsing engines may be combined into a single parsing engine or into a different number of parsing engines than those shown in FIG. 3. The standardized policy data may be stored in the plan metadata 215.

The policy data may include coverage information, including but not limited to the types of claims are covered by each policy, the limits of coverage provided by each policy, other information that may be used to determine whether an insurer may cover a particular claim for a user. The census data 220 may include demographic information that is collected from the user by the CAAS 205, information about the user obtained from third-party data providers 130, information obtained from the insurer portals 125, and/or other information about the users that may be used by the CAAS 205 to provide recommendations to the user regarding insurance-related issues. The user-related data obtained from these various sources may be formatted into a standard schema by one or more parsing engines of the CAAS 205 and stored in the census data 220.

The raw data layer 205 shown in FIG. 2 includes six API units configured to implemented APIs for accessing data from various sources. Some implementations of the raw data layer 205 of the CAAS 105 may include a different number of APIs for accessing data from the various data sources. The types of data sources accessed and processed by the raw data layer may depend at least in part on the functionality provided by the insights layer 290 discussed in greater detail in the examples which follow.

The claims and policy API 240 is configured to obtain policy information and/or insurance claims information from insurers via the insurer portals 125. As discussed in the preceding examples, the CAAS 205 may be configured to provider a user interface that guides the user through linking their account with the CAAS 205 to their accounts with their insurers. The claims and policy API 240 may be configured to retrieve policy information and/or claims information from each insurer and store the raw data in the data lake 210. The insurance policy information may be converted to the standard schema by the policy parsing engine 315 and the claims information may be converted to a standard schema by the claims and prescriptions parsing engine 320 shown in FIG. 3.

The policy information for users may be kept up to date in substantially real-time. The claims and policy API 240 may be configured to periodically check for updates to the policy information for users. The claims and policy API 240 may also check for updates to the policy information for the user in response to a request from the event-based notification layer 250 or the insights layer 290. In some implementations, the claims and policy API 240 may receive updates to the claims information and/or the policy information from the insurer in response to the changes or renewal of a policy or in response to claims being submitted to the insurer for reimbursement.

The HSA provider API 225 may be configured to obtain information from one or more HSA providers. The HSA provider API 225 can obtain information associated with the HSA account of a user, such as but not limited to the current balance, historical reimbursement information for claims reimbursed by the HSA account, and/or other information associated with the usage of the HSA account. The HSA information may be used by the CAAS 205 to build a historical model of the number and types of claims submitted for reimbursement by the user and to make predictions for recommended future funding of the HSA based on the historical usage. The HSA information may be obtained by the HSA provider API 225 may be stored in data lake 210. The HSA information may be converted to the standard schema by the HSA parsing engine 330 shown in FIG. 3. The HSA account information may also be considered by the CAAS 205 when analyzing the insurance coverage of the user and for recommending coverage that accommodates the needs of the user. While the examples discussed herein discuss the use of HSAs, the HSA provider API 225 may also be configured to obtain information for flexible spending accounts (FSAs) as well. FSAs are another type of spending account that are typically associated with an employer. FSAs may have different eligibility criteria for enrollment and different contribution limits than HSAs. Furthermore, unused funds in an FSA may be forfeited at the end of the calendar year while unused funds in an HSA typically may roll over to the next year.

The prescription API 235 may be configured to obtain prescription price information from a pharmacy benefits manager (PBM). Information regarding the prescriptions that a user has been prescribed may be obtained directly from the user and/or determined based on the claims information obtained from the insurance providers via the claims and policy API 240. The prescription price information may be utilized by the prescription benefits guidance unit 265.

The insurance plan quote API 230 may be configured to obtain quotes for insurance coverage from insurers that may be used by the CAAS 205 to create a comprehensive bundle of insurance policies for a user based at least in part on predicted insurance consumption by the user. The insurance plan quote API 230 may be configured to submit requests for quotes to insurers for medical insurance, dental insurance, accident insurance, hospital indemnity insurance, auto insurance, and/or other types of insurance. The insurance portfolio planning unit 275 may use the quote information to build a comprehensive insurance plan for the user that is based on the needs of the user. The insurance portfolio planning unit 275 may determine the needs of the user based on user data that includes, but is not limited to, the user's medical history, past insurance consumption, the user's financial profile (debts, assets, liabilities), family information, psychographics, interests, occupation, salary, physical activity, and/or other information that may be used to infer the needs of the user.

The eligibility API 245 may be configured to verify enrollment of a user with an insurer. The API 245 may be used to determine whether the user is covered by a particular policy and whether the user is eligible for certain types of claims to be reimbursed by the insurer. The eligibility information may be utilized by the CAAS 205 to determine whether a particular claim or type of claims may be covered by a particular insurer. The eligibility information may be accessed substantially in real-time so that recommendations provided by the CAAS 205 are based on current enrollment status of the user.

The third-party data API 280 may be configured to submit queries for third-party data to the third-party data provider 130. The third-party data sources may include but are not limited to sources of medical history data, financial profile information, credit history information, marital status information and/or family information, occupation, salary, and/or other information that may be used by the CAAS 105 to provide various recommendations to the user. The third-party data API 280 may be used by the various components of the CAAS 105 to query the various data sources for third party data.

The event-based notification layer 250 may utilize conditional logic, machine learning models, and/or artificial intelligence systems for analyzing the data obtained and/or generated by the raw data layer 205. The event-based notification layer 250 may be configured to analyze the data from the raw data layer 205 to support the functionality of the services provided by the insights layer 290. The event-based notification layer 250 may utilize one or more machine learning models to analyze the data maintained by the raw data layer 205. The event-based notification layer 250 may implement elements of the benefits utilization engine 325 shown in FIGS. 3 and 4.

The insights layer 290 may provide various services to the user based on the analysis of the data by the event-based notification layer 250. The insights layer 290 includes a claims concierge unit 255, a spending account guidance unit 260, a prescription benefits guidance unit 265, a proactive benefits engagement unit 270, and an insurance portfolio planning unit 275.

The claims concierge unit 255 may be configured to analyze claims data and to provide recommendations to the user for submitting the claims to an insurer. The claims concierge unit 255 may be configured to automatically analyze claims data to identify claims that may be paid by an insurer. The claims concierge unit 255 may also provide recommendations in response to a request from a user to analyze one or more pending insurance claims.

The spending account guidance unit 260 may provide guidance to the user for optimizing the funding of the MSA based on prior health plan consumption and utilizing the MSA funds to reimburse medical claims costs. The prescription benefits guidance unit 265 may provide guidance to the user for providing prescription price guidance to the user including prices at which prescriptions medications are being offered at pharmacies located near the user.

The proactive benefits engagement unit 270 may provide recommendations to the user for optimizing the usage of their benefits. The proactive benefits engagement unit 270 may be configured to provide meaningful and actionable notifications to encourage users to engage with the benefits provided by their insurance policies. The proactive benefits engagement unit 270 may consider the personal finances of the user and other factors when making recommendations to the user regarding the usage of the user's benefits. Additional features of the proactive benefits engagement unit 270 are provided in the examples which follow.

The insurance portfolio planning unit 275 may provide recommendations to the user for building insurance bundles that consider the user's demographics, risk aversion of the user, and the needs of the user.

FIG. 3 is a diagram that shows an example implementation of a benefits utilization engine 325 that may be implemented by the CAAS 105. The benefits utilization engine 325 may be configured to provide machine-learning driven recommendations for assisting the user in utilizing their benefits and insurance. Additional details of the services provided by the benefits utilization engine 325 are provided in the examples which follow. The benefits utilization engine 325 may be implemented in part by elements of the raw data layer 205, the event-based notification layer 250, and the insights layer 290 shown in FIG. 2.

The policy information 305 may include multiple insurance policies, such as but not limited to medical insurance policies, dental insurance policies, accident insurance policies, disability insurance policies, critical illness insurance policies, auto insurance policies, and/or other types of insurance policies. The benefits utilization engine 325 may use this information to obtain information about the current insurance coverage of a user and to obtain information for claims that were previously made against insurance the user's insurance policies. The past claim information may be used by the benefits utilization engine 325 to predict future claims consumption by the user based upon a demographic cluster into which the user is predicted to fall. The predicted consumption information may be used to generate a recommended comprehensive insurance plan for the user that includes a bundle of insurance policies. The past claim information may also be used to identify claims associated with out-of-network providers and to provide recommendations to the user to reduce medical spending by suggesting in-network providers that may be utilized in the future.

The policy information 305 may be obtained by the claims and policy API 240 of the raw data layer 205 shown in FIG. 2. Electronic copies of the policies may be obtained from the insurers in a Portable Document Format (PDF), or another electronic format supported by each insurer. Insurers may support different electronic file formats and the layout of the policy information provided by each insurer may vary. The policy information obtained from the insurers may be stored in the data lake 210 of the raw data layer 205. The policy parsing engine 315 may be configured to analyze the raw policy data obtained from the insurers and to convert the policy information to a standard schema. The standardized information may be stored in the plan metadata 215. The plan metadata may include coverage information, policy limits, deductible information, claims information, and/or other information that may be used by the CAAS 105 to determine whether a particular insurer may reimburse the policy holder for a particular type of claim or claims. The policy information may also be used by the benefits utilization engine 325 to provide guidance to the user in utilizing their available benefits.

The policy parsing engine 315 may be configured to use fuzzy matching techniques to map policy coverage information extracted from the insurance policies to standardized coverage information. Insurers may use slightly different language to describe the coverage provided. The policy parsing engine 315 may be configured to map the policy coverage information with a set of standardized insurance coverage descriptions maintained by the CAAS 105. The standardized insurance coverage descriptions may include descriptions of types of coverage that may be offered by insurers. The policy parsing engine 315 may be configured to perform a probabilistic data match on the coverage information provided in an insurance policy with the standardized coverages descriptions. The policy parsing engine 315 may be configured to select a standardized description that is associated with the highest probability of being a match with the policy coverage description. The matching standardized description may be stored in with the policy information in the plan metadata 215 and may be used by the benefits utilization engine 325 to determine coverage limits, copays and other patient responsibility amounts, out-of-network related costs, and/or other information that may be used to provide recommendations to user to assist them in more fully utilizing the benefits available to them. The plan metadata 215 may also include information for preventative care information and/or other benefits that may be no cost or low-cost benefits provided by the insurance policy, such as but not limited to periodic physical health examinations, periodic dental examinations and cleanings, and discounts of health club memberships.

Mapping the policy coverage information to standard descriptions may provide a significant technical benefit by improving the predictions that are provided by the machine learning models used by the benefits utilization engine 325. The machine learning models may be trained using training data that includes the same standard insurance coverage descriptions that will be used by the benefits utilization engine 325 for providing recommendations and reminders to the insured user for utilizing their benefits and insurance. Thus, the machine learning models may be presented policy coverage data for analysis that utilizes descriptions consistent with the coverage descriptions included in the training data used to train the model.

The claims and prescription information 310 may include substantially real-time information from a medical claims feed and prescription feed. The medical claims information represents insurance claims that the user has submitted or has had submitted on their behalf for reimbursement. The prescription information represents prescriptions that have been prescribed to the user and may be submitted for reimbursement to an insurer. The claims and/or prescription information may be obtained by the claims and policy API 240 shown in FIG. 2 and the data stored in the data lake 210. The claims and prescription information obtained from each of the insurers may be in different electronic formats and/or layouts. The claims and prescription information may be processed by the claims and parsing engine 320 to convert the claims and prescription information into the standard schema utilized by the CAAS 105. The claims and prescription information in the standardized schema may be stored with the plan metadata 215.

The claims and prescription parsing engine 320 may be configured to use fuzzy matching techniques to map the claims and prescription information 310 to standardized claims and prescription descriptions before the claims and prescription information is analyzed by the claims and prescription parsing engine 320. Medical providers may use inconsistent language to describe the procedures performed. One medical provider may describe the same procedure in a slightly different way than another provider. Such inconsistencies in the description of the procedures performed can make determining whether a particular policy covers a particular claim or prescription. The set of standardized claim and prescription descriptions may provide a consistent set of descriptions that may be associated with claims and prescriptions. The claims and prescription parsing engine 320 may be configured to perform a probabilistic data match on the claims and prescription information 310 with the standardized claim and prescription descriptions. The claims and prescription parsing engine 320 may be configured to select a standardized description that is associated with the highest probability of being a match with the description of the procedure performed and/or other information included in the claim and/or prescriptions submitted to the insurer on behalf of a user.

The standardized description matched with a claim may be stored with the claim information in the plan metadata 215 associated with the claim. The standardized description may also be used by the CAAS 105 to determine whether the user has a policy that is likely to cover the claim. The policy information may also be used by the benefits utilization engine 325 to make recommendations to the user regarding costs associated with out-of-network providers, and/or no cost or low-cost preventive coverage options, such as but not limited to periodic physical health examinations, periodic dental examinations and cleanings, and discounts of health club memberships. Mapping the claims and prescription information to standard descriptions provides the technical benefit of improving the predictions that are provided by the machine learning models used by the benefits utilization engine 325. The machine learning models may be trained using training data that includes the same standard claim and/or prescription descriptions that will be used by the benefits utilization engine 325 to make recommendations to the user for making better use of their benefits. Thus, the machine learning models are presented claims and prescription descriptions for analysis that utilizes descriptions consistent with the claims and prescription descriptions included in the training data used to train the models.

If the probability of the standardized description matching a particular claim is less than a predetermined threshold, the claims and prescription parsing engine 320 may flag the claim for additional processing. The user may be prompted to provide additional information that may be used to help disambiguate the claim and/or to request that a different description for the claim be provided. Standardizing the descriptions of the claims may increase the likelihood that the benefits utilization engine 325 may correctly analyze the claims and utilization to make recommendations to the user for utilizing their benefits.

The HSA parsing engine 330 may be configured to obtain substantially real-time information for health spending accounts via the HSA provider API 225. The HSA information may include but is not limited to the current balance of funds in the HSA, historical reimbursement information for claims reimbursed by the HSA account, and/or other information associated with the usage of the HSA account. The HSA parsing engine 330 may be configured to convert the HSA information into the standard schema utilized by the CAAS 105. The HSA information in the standardized schema may be stored with the plan metadata 215. The HSA parsing engine 330 may be configured to use fuzzy matching techniques to map the claims and prescription information 310 to standardized claims and prescription descriptions before the claims and prescription information is analyzed by the benefits utilization engine 325.

The benefits utilization engine 325 analyzes the information received from the policy parsing engine 315 and the claims and prescription parsing engine 320, and/or one or more third-party data providers 130 to provide various services that may include: (1) claims-based updates or alerts that include information that indicates that a claim or claims have been filed on behalf of the user and reminders regarding patient responsibility for any amounts associated with the claims, (2) reminders for routine no cost or low-cost medical treatments and/or other benefits, (3) spending trend information for HSAs and/or FSAs, (4) out-of-network visit alerts to notify the user that they have used an out-of-network provider, and (5) monthly saving report that provides an analysis of the user's monthly insurance-related activity that provides details where the user saved money and/or information identifying activities where the user may have saved additional money had they taken different actions.

FIGS. 6A-6G, described in detail below, provide an example of a user interface that may be provided to the CAAS 105. These examples in FIGS. 6A-6G illustrate a various reports and reminders that may be generated by the benefits utilization engine 325. These reports may assist the user in more fully utilizing their benefits.

Figure 4:
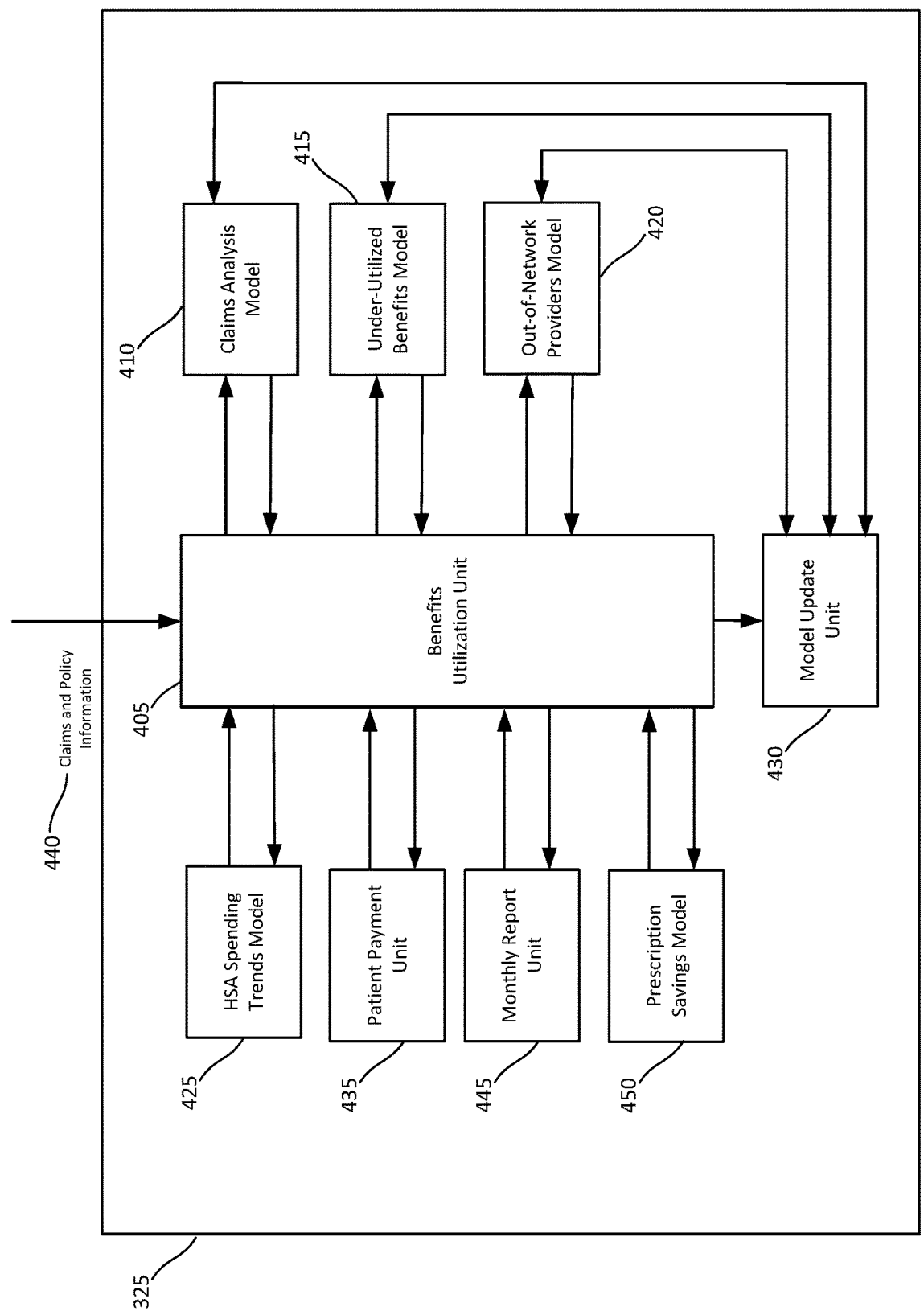
FIG. 4 is a diagram of an example architecture that shows additional details of the CAAS that may be used to implement the CAAS shown in FIGS. 1-3.

FIG. 4 is a diagram showing an example implementation of the benefits utilization engine 325 of the CAAS 105. The benefits utilization engine 325 may include a benefits utilization unit 405, a claims analysis model 410, an under-utilized benefits model 415, an out-of-network providers model 420, HSA spending trends model 425, a patient payment unit 425, benefits report unit 445, a prescription savings model 450, and a model update unit 430. Other implementations may have a different configuration with a different number of machine learning models configured to support the recommendations for assisting the user in utilizing their benefits and insurance.

The benefits utilization engine 325 may analyze user data from the various sources discussed above in order to recommendations for assisting the user in utilizing their benefits and insurance. A recommendation may be generated on demand in response to a request from the user or automatically by the CAAS 105. The CAAS 105 may be configured to analyze the user data and generate the recommendations according to a schedule or in response to certain events.

The benefits utilization unit 405 may be configured to obtain claims, policy, and user demographic information 440 to be analyzed to provide various recommendations to the user for more fully utilizing their benefits. The claims, policy, and demographic information 440 include the standardized policy coverage information output by the policy parsing engine 315. The claims and policy information 440 may also include the claims and prescription information into the standard schema output by the claims and parsing engine 320, and the standardized health spending account information output by the HSA parsing engine 330.

The benefits utilization engine 325 may utilize the claims analysis model 410 to analyze the claims information and to identify claims for which there is "patient responsible" amount due associated with the claim. The patient responsible amount may be indication in an Explanation of Benefits or other information that has been obtained from a medical services provider. The data may be stored in the data lake 210 and/or in other memory locations by the raw data layer 205. The benefits utilization engine 325 may utilize the predictions provided by claims analysis model 410 to generate the claims activity report shown in the user interface 640 shown in FIG. 6E. The claims activity report may provide guidance to the user for making payments to the insurers for the amounts due via the patient payment unit 435.

The benefits utilization engine 325 may utilize the under-utilized benefits model 415 to analyze the claims and policy information 440 to identify benefits that have been under-utilized or unutilized. The benefits utilization engine 325 may utilize the predictions provided by the under-utilized benefits model 415 to generate the benefits reminders shown in the user interface 645 shown in FIG. 6F. The under-utilized benefits model 415 may compare claims information submitted on behalf of the user with policy provisions included in the policy information to identify benefits that have not been utilized or only partially utilized by the user. The under-utilized benefits model 415 may also identify benefits, such as discounts, health club memberships, and/or other information that may not be reflected in the claims information for the user. These reminders regarding these benefits may be presented to the user. The benefits reminders may provide guidance to the user for utilizing benefits that may be no cost or low-cost benefits provided by the benefits and insurance package of the user. The benefits may be preventative benefits, such as medical or dental checkup or tests, and/or discounts for various goods or services that may be provided by the benefits and insurance package of the user.

The benefits utilization engine 325 may utilize the out-of-network providers model 420 to identify services obtained from medical providers that are outside of the network of providers who do not have a contract with the user's health insurance provider. The out-of-network providers model 420 may compare provider information associated with claims submitted on behalf of the user with in-network provider information that may be obtained from the insurer portals 125 for each of the user's policies. The out-of-network providers model 420 may predict an amount that the user may have saved by selecting an in-network provider for these services. The benefits utilization engine 325 may utilize the predictions provided by the out-of-network providers model 420 to generate the claims activity report shown in the user interface 615 shown in FIG. 6C. The claims activity report may provide guidance to the user for making payments to the insurers for the amounts due via the patient payment unit 435.

The benefits utilization engine 325 may utilize the HSA spending trends model 425 to identify trends in the usage of the user's health savings account. The benefits utilization engine 325 may utilize the predictions provided by the HSA spending trends model 425 to generate the health savings account activity report shown in the user interface 620 shown in FIG. 6D. The health savings account activity report may include estimated utilization of the HSA and recommendations for adjusting the funding of the account based on these recommendations.

The benefits utilization engine 325 may utilize the prescription savings model 450 to identify potential savings for the user's prescriptions. The benefits utilization engine 325 may utilize the predictions provided by the prescription savings model 450 to generate the prescription savings opportunity report shown in the user interface 610 shown in FIG. 6B. The prescription savings model 450 may obtain prescription information from one or more PBMs via the prescription API 235. The prescriptions saving model 450 may use this information to provide recommendations regarding potential prescription cost savings by obtaining the prescriptions from alternative pharmacies and/or utilizing generic medications instead of their name brand counterpart.

The model update unit 430 may be configured to provide feedback to the claims analysis model 410 to refine the training of the model. The model update unit 430 may receive feedback directly from the user and/or from the plan recommendation unit 405. Feedback from the user may be obtained from the plan recommendation unit 405 in response to the user opting to not to select one or more policies associated with a recommendation or completely rejecting the proposed bundle of policies. The feedback may be used to further refine the clustering predicted by the claims analysis model 410.

FIGS. 6A-6G are diagrams showing an example user interfaces of the CAAS 105 for presenting. The user interfaces shown in FIGS. 6A-6G may be rendered by a browser application or a native application installed on a client device, such as the client devices 115a-115c shown in FIG. 1. The CAAS 105 may be configured to provide content renderable by a web browser installed on the client device. The CAAS 105 may also be configured to provide content to a native application installed on the client device which is configured to render the content received from the CAAS 105, to allow a user to interact with the content, and to receive requests for data and/or to perform various operations on the data maintained by the CAAS 105.

FIG. 6A is a diagram of an insurance dashboard user interface 605. The insurance dashboard user interface 605 may be implemented by the proactive benefits engagement unit 270 of the insights layer 290 of the CAAS 105. The insurance dashboard user interface 605 includes a notification pane 625, benefits details pane(s) 630, and a spending overview pane 635. The spending overview pane 635 provides a summary of how much medical, dental, and pharmacy spending for the user so far for the year or other period of time. The example implementation of the insurance dashboard user interface 605 shown in FIG. 6A shows one possible implementation of such an interface. Other implementations may present additional information to the user instead of or in addition to the information provided in this example.

The benefits details pane(s) 630 provide suggestions for benefits that the insured may wish to take advantage of save money on their health care, to take advantage of discounts that the user in entitled to under one or more of their insurance policies, and/or free benefits to which the user is entitled under one or more of their insurance policies. The benefit details pane(s) 630 may be populated by alerts generated by the benefits utilization engine 325. The user may click on or otherwise activate the "Save Now" button in a pane to launch a user interface that provides details of the particular alert. Alternatively, the user may click on or otherwise activate the "Browse" button to browse through the alerts. Examples of the user interfaces that may be provided for various types of alerts are shown in FIGS. 6B-6F. FIG. 6B is a diagram of a user interface 610 that presents a prescription savings opportunity alert that may be present information to the user providing information how the user may be able to save money on prescriptions. The user may be presented with multiple prescription savings opportunity alerts if the benefits utilization engine 325 identifies multiple opportunities for the user to save on prescriptions for themselves or other insured persons on their policies. FIG. 6C is a diagram of a user interface 615 that presents claims activity report that shows out-of-network provider visits that alerts the user to potential savings by switching to an in-network provider. The claims activity report includes a list of in-network providers that are located proximate to the user's home, work, or other location. The user interface 615 may provide information guiding the user through switching to one of the suggested providers. FIG. 6D is diagram of a user interface 620 that presents a health savings account activity report that may present to the user the current balance of their HSA and any utilization of the HSA funds to pay for claims over a predetermined period of time. FIG. 6E is a diagram of a user interface 640 that presents a claims activity report that presents information for claims for which the user owes a copy or other amount associated with the claim. The user interface 640 may include a "Make Payment" button associated with the claims that may guide the user through the steps to pay the amount due. FIG. 6F is a diagram of a user interface 645 presents benefit reminders for no cost and/or low-cost benefits to which the user and/or their other insured parties on the polices are entitled. The low-cost benefits may include discounts for health-related services, such as but not limited to health club memberships. FIG. 6G is a diagram of a user interface 650 that presents a benefits usage summary report 655 which may be generated by the benefits report unit 445. The benefits usage summary report 655 provides a detailed summary of how much the user has spent over the past month, past quarter, past year, or other period of time. The period of time shown may be selectable by the user, and the report may provide examples of how the user save money as well as examples of other actions that the user took that cost money and alterative actions that could have been taken to reduce costs.

Figure 7:
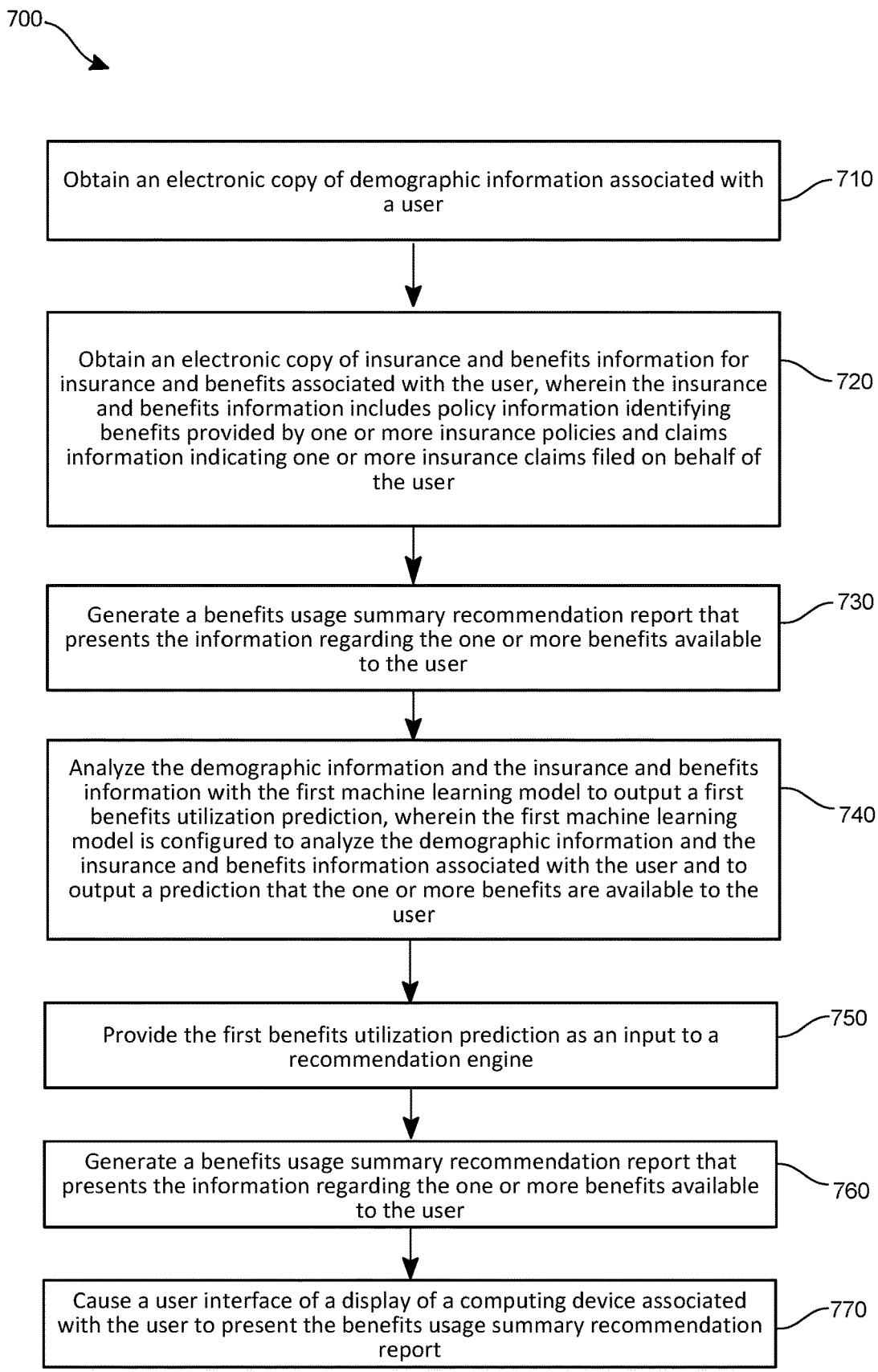
FIG. 7 is a flow chart of an example process for recommending benefits available on an insurance plan.

FIG. 7 a flow chart of an example process 700 for recommending benefits available on an insurance plan. The process 700 may be implemented by the CAAS 105 discussed in the preceding examples.

The process 700 may include an operation 710 of obtaining an electronic copy of demographic information associated with a user. As discussed in the preceding examples, the user demographic information may be collected from the user via the insurance questionnaire unit 330, from the third-party data providers 130, or both. The demographic information may include various information about the user, such as but not limited to, age, sex, race, and/or other information. The demographic information may include other factors associated with the user, such as but not limited to, past insurance claims information, medical history information, financial profile information, credit history information, family information, psychographics, interests, occupation, salary, physical activity, and other information that may be used to group users into clusters of people having similar characteristics.

The process 700 may include an operation 720 of obtaining an electronic copy of insurance and benefits information for insurance and benefits associated with the user, wherein the insurance and benefits information includes policy information identifying benefits provided by one or more insurance policies and claims information indicating one or more insurance claims filed on behalf of the user. The benefits utilization engine 325 may be configured to obtain the policy information from the policy parsing engine 315 and claims and prescription information from the claims and prescription parsing engine 320.

The process 700 may include an operation 730 of providing the demographic information and the insurance and benefits information to a first machine learning model and an operation 740 of analyzing the demographic information and the insurance and benefits information with the first machine learning model to output a first benefits utilization prediction, wherein the first machine learning model is configured to analyze the demographic information and the insurance and benefits information associated with the user and to output a prediction that the one or more benefits are available to the user. The benefits utilization engine 325 may analyze the data using one or more machine learning models to generate the predictions.

The process 700 may include an operation 750 of providing the first benefits utilization prediction as an input to a recommendation engine and an operation 760 of generating a benefits usage summary recommendation report that presents the information regarding the one or more benefits available to the user based on the first benefits utilization prediction. The benefits report unit 445 may present examples of the benefits that the user may make use of to save money, or that may be free or low-cost. An example of such a report is shown in FIG. 6G.

The process 700 may include an operation 770 of causing a user interface of a display of a computing device associated with the user to present the benefits usage summary recommendation report. The benefits utilization engine 325 may cause the user's client device 115 to display the benefits usage summary recommendation report. As discussed in the preceding examples, the user may interact with the CAAS 105 via a native application associated with the CAAS 105 on the client device 115 or via a web browser on the client device 115. The recommendations associated with the available benefits may be presented to the user.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
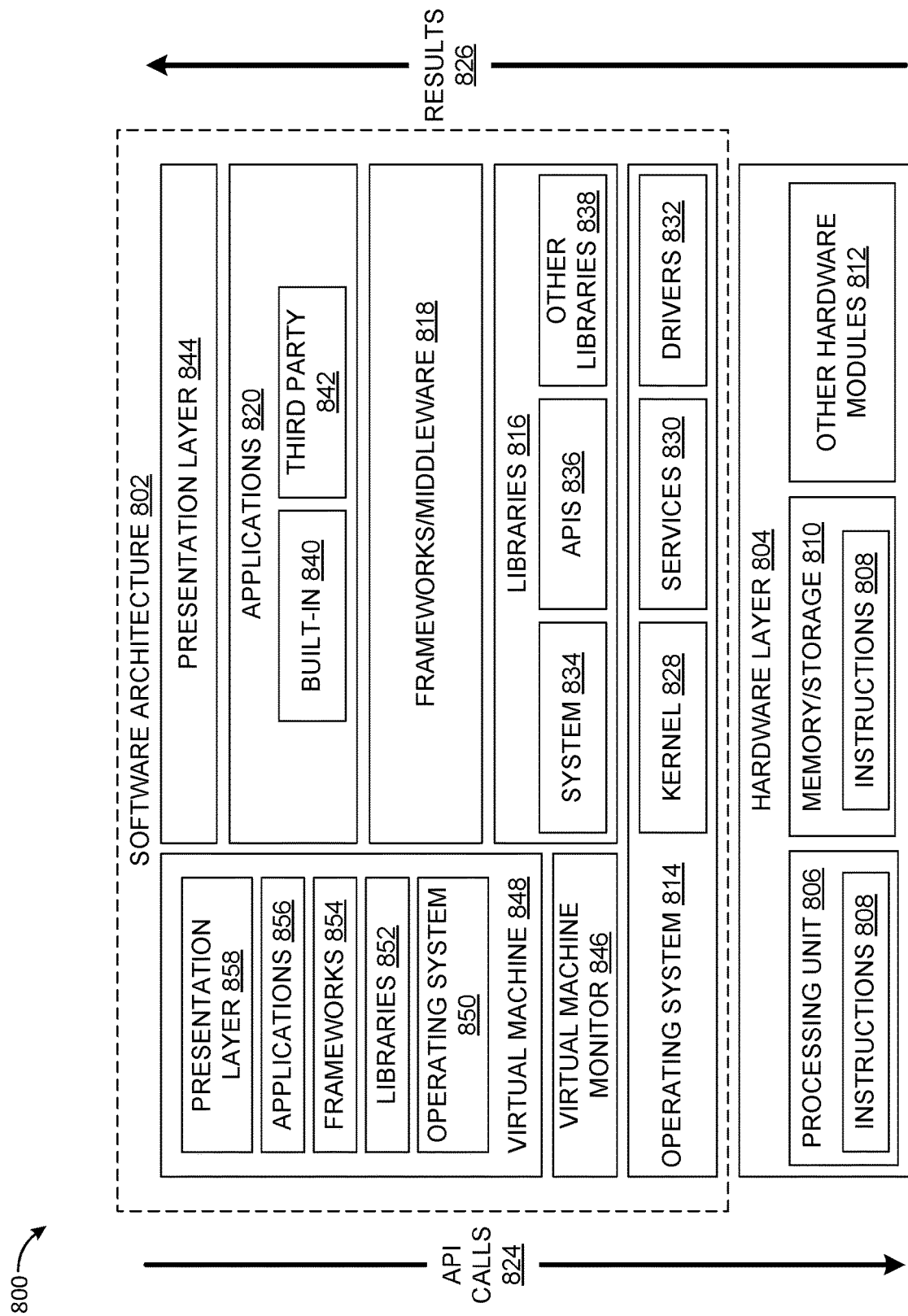
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
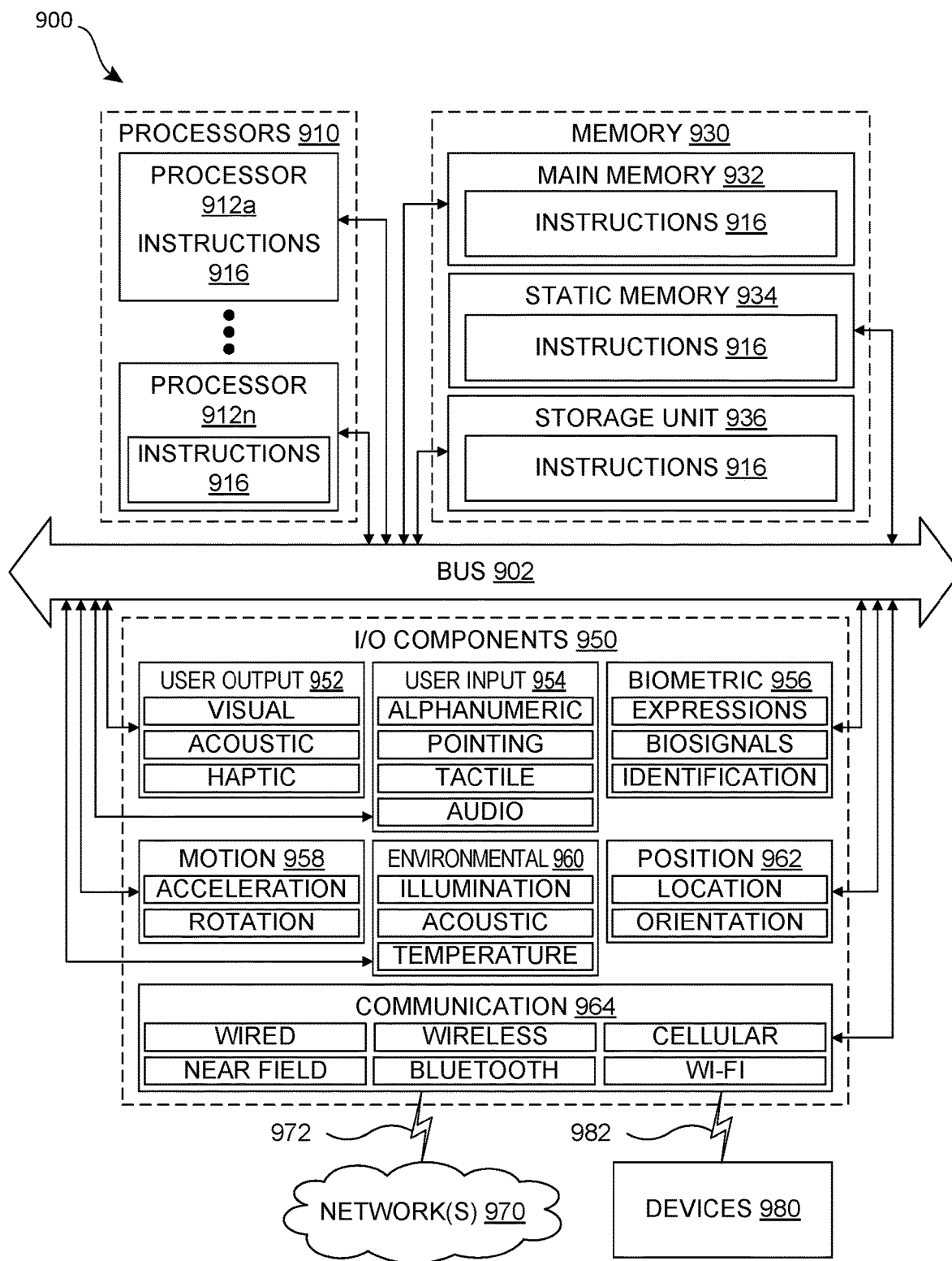
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peerto-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
      obtaining, via an insurance portal, an electronic copy of demographic information associated with a user from a first third-party data provider, wherein the insurance portal is configured on a virtual machine that is configured on at least one physical server and supports a first authentication pipeline with the third-party data provider for access control, and the at least one physical server connects with the third-party data provider via a network;
      obtaining, via the insurance portal, an electronic copy of current insurance and benefits information for insurance and benefits associated with the user from different insurance and benefit providers, wherein the insurance and benefits information includes policy information identifying benefits provided by a plurality of existing insurance policies that have already been issued by the different insurance and benefit providers to the user and claims information indicating one or more insurance claims filed on behalf of the user, wherein the insurance policies provide different benefit coverages to the user, wherein the insurance portal supports a second authentication pipeline with the different insurance and benefit providers, and wherein the at least one physical server connects with the different insurance and benefit providers via a network;

generating standardized policy information from the policy information identifying the different benefit coverages by:

converting the policy information from a first format used by an insurance provider to a second format associated with a standard schema for processing the insurance and benefits information; and mapping coverage descriptions of the policy information identifying the different benefit coverages to standardized coverage descriptions by performing a probabilistic data match between the coverage descriptions from the policy information identifying the different benefit coverages and the standardized coverage descriptions using one or more fuzzy matching techniques, and for each respective coverage description of the policy information, selecting a respective standardized coverage description having a highest probability of matching the respective coverage description of the policy information identifying the different benefit coverages;

storing the electronic copy of the demographic information, the electronic copy of the insurance and benefit information, and the standardized policy information identifying the different benefit coverages in a persistent data store associated with the data processing system;

receiving a request via the insurance portal from a computing device associated with the user for a benefits usage summary recommendation report, wherein the insurance portal supports a third authentication pipeline with the computing device, and wherein the at least one physical server connects with the computing device via a network;

in response to receiving the request for the benefits usage summary recommendation report:

providing the demographic information and the standardized policy information identifying the different benefit coverages to a first machine learning model;

analyzing the demographic information and the standardized policy information identifying the different benefit coverages using the first machine learning model in substantially real-time to output a first benefits utilization prediction, the first machine learning model being trained using first training data formatted according to the standard schema and including the standardized coverage descriptions, wherein the first machine learning model is configured to analyze the demographic information and the standardized policy information identifying the different benefit coverages associated with the user in substantially real-time and to identify benefits that are currently available to the user under the existing policies that have already been issued to the user but have not been utilized or have not been fully utilized by the user;

providing the first benefits utilization prediction as an input to a recommendation engine;

automatically generating, using the recommendation engine, a benefits usage summary recommendation report message including information regarding one or more benefits currently available to the user based on the first benefits utilization prediction, the benefits usage summary recommendation report message including information of one or more benefits currently available to but have not been utilized or have not been fully utilized by the user and information in the standardized policy information describing the one or more benefits;

sending the benefits usage summary recommendation report message via the network in substantially real-time to the computing device associated with the user; and causing a user interface of the computing device associated with the user to present the benefits usage summary recommendation report message.

2. The data processing system of claim 1, wherein the prediction that the one or more benefits are currently available to the user indicates that one or more prescriptions prescribed to the user may be obtained at a cheaper price at an alternative pharmacy.

3. The data processing system of claim 1, wherein the prediction that the one or more benefits are currently available to the user indicates that the user could have saved a first amount on a first claim had the first claim been submitted to an in-network provider, and wherein the existing insurance policies include a medical insurance policy, a dental insurance policy, an accident insurance policy, a disability insurance policy, a critical illness insurance policy, an auto insurance policy, a hospital indemnity insurance policy, or a combination thereof.

4. The data processing system of claim 1, wherein the prediction that the one or more benefits are currently available to the user includes a prediction of consumption of funds of a health savings account associated with the user, and wherein the third authentication pipeline provides two-factor authentication.

5. The data processing system of claim 1, wherein the prediction that the one or more benefits are currently available to the user includes a prediction of an amount owed by the user for one or more insurance claims.

6. The data processing system of claim 1, wherein the prediction that the one or more benefits are currently available to the user includes a prediction that one or more no cost or low-cost benefits are currently available and have not been used by the user.

7. A method implemented in a data processing system for machine-learning driven data analysis and reminders, the method comprising:

obtaining, via an insurance portal, an electronic copy of demographic information associated with a user from a first third-party data provider, wherein the insurance portal is configured on a virtual machine that is configured on at least one physical server and supports a first authentication pipeline with the third-party data provider for access control, and the at least one physical server connects with the third-party data provider via a network;

obtaining, via the insurance portal, an electronic copy of current insurance and benefits information for insurance and benefits associated with the user from different insurance and benefit providers, wherein the insurance and benefits information includes policy information identifying benefits provided by a plurality of existing insurance policies that have already been issued by the different insurance and benefit providers to the user and claims information indicating one or more insurance claims filed on behalf of the user, wherein the insurance policies provide different benefit coverages to the user, wherein the insurance portal supports a second authentication pipeline with the different insurance and benefit providers, and wherein the at least one physical server connects with the different insurance and benefit providers via a network;
generating standardized policy information from the policy information identifying the different benefit coverages by:
converting the policy information from a first format used by an insurance provider to a second format associated with a standard schema for processing the insurance and benefits information; and
mapping coverage descriptions of the policy information identifying the different benefit coverages to standardized coverage descriptions by performing a probabilistic data match between the coverage descriptions from the policy information identifying the different benefit coverages and the standardized coverage descriptions using one or more fuzzy matching techniques, and for each respective coverage description of the policy information, selecting a respective standardized coverage description having a highest probability of matching the respective coverage description of the policy information identifying the different benefit coverages;
storing the electronic copy of the demographic information, the electronic copy of the insurance and benefit information, and the standardized policy information identifying the different benefit coverages in a persistent data store associated with the data processing system;
receiving a request via the insurance portal from a computing device associated with the user for a benefits usage summary recommendation report, wherein the insurance portal supports a third authentication pipeline with the computing device, and wherein the at least one physical server connects with the computing device via a network;
in response to receiving the request for the benefits usage summary recommendation report:
providing the demographic information and the standardized policy information identifying the different benefit coverages to a first machine learning model;
analyzing the demographic information and the standardized policy information identifying the different benefit coverages using the first machine learning model in substantially real-time to output a first benefits utilization prediction, the first machine learning model being trained using first training data formatted according to the standard schema and including the standardized coverage descriptions, wherein the first machine learning model is configured to analyze the demographic information and the standardized policy information identifying the different benefit coverages associated with the user in substantially real-time and to identify benefits that are currently available to the user under the existing policies that have already been issued to the user but have not been utilized or have not been fully utilized by the user;
providing the first benefits utilization prediction as an input to a recommendation engine;
automatically generating, using the recommendation engine, a benefits usage summary recommendation report message including information regarding one or more benefits currently available to the user based on the first benefits utilization prediction, the benefits usage summary recommendation report message including information of one or more benefits currently available to but have not been utilized or have not been fully utilized by the user and information in the standardized policy information describing the one or more benefits;
sending the benefits usage summary recommendation report message via the network in substantially real-time to the computing device associated with the user; and
causing a user interface of the computing device associated with the user to present the benefits usage summary recommendation report message.

8. The method of claim 7, wherein the prediction that the one or more benefits are currently available to the user indicates that one or more prescriptions prescribed to the user may be obtained at a cheaper price at an alternative pharmacy.

9. The method of claim 7, wherein the prediction that the one or more benefits are currently available to the user indicates that the user could have saved a first amount on a first claim had the first claim been submitted to an in-network provider, and
wherein the existing insurance policies include a medical insurance policy, a dental insurance policy, an accident insurance policy, a disability insurance policy, a critical illness insurance policy, an auto insurance policy, a hospital indemnity insurance policy, or a combination thereof.

10. The method of claim 7, wherein the prediction that the one or more benefits are currently available to the user includes a prediction of consumption of funds of a health savings account associated with the user, and
wherein the third authentication pipeline provides two-factor authentication.

11. The method of claim 7, wherein the prediction that the one or more benefits are currently available to the user includes a prediction of an amount owed by the user for one or more insurance claims.

12. The method of claim 7, wherein the prediction that the one or more benefits are currently available to the user includes a prediction that one or more no cost or low-cost benefits are currently available and have not been used by the user.

13. A machine-readable storage medium on which are stored instructions that, when executed, cause a processor of a programmable device to perform operations of:
obtaining, via an insurance portal of a data processing system, an electronic copy of demographic information associated with a user from a first third-party data provider, wherein the insurance portal is configured on a virtual machine that is configured on at least one physical server and supports a first authentication pipeline with the third-party data provider for access control, and the at least one physical server connects with the third-party data provider via a network;
obtaining, via the insurance portal, an electronic copy of current insurance and benefits information for insurance and benefits associated with the user from different insurance and benefit providers, wherein the insurance and benefits information includes policy information identifying benefits provided by a plurality of existing insurance policies that have already been issued by the different insurance and benefit providers to the user and claims information indicating one or more insurance claims filed on behalf of the user, wherein the insurance policies provide different benefit coverages to the user, wherein the insurance portal supports a second authentication pipeline with the different insurance and benefit providers, and wherein the at least one physical server connects with the different insurance and benefit providers via a network;

generating standardized policy information from the policy information identifying the different benefit coverages by:

converting the policy information from a first format used by an insurance provider to a second format associated with a standard schema for processing the insurance and benefits information; and mapping coverage descriptions of the policy information identifying the different benefit coverages to standardized coverage descriptions by performing a probabilistic data match between the coverage descriptions from the policy information identifying the different benefit coverages and the standardized coverage descriptions using one or more fuzzy matching techniques, and for each respective coverage description of the policy information, selecting a respective standardized coverage description having a highest probability of matching the respective coverage description of the policy information identifying the different benefit coverages;

storing the electronic copy of the demographic information, the electronic copy of the insurance and benefit information, and the standardized policy information identifying the different benefit coverages in a persistent data store associated with the data processing system;

receiving a request via the insurance portal from a computing device associated with the user for a benefits usage summary recommendation report, wherein the insurance portal supports a third authentication pipeline with the computing device, and wherein the at least one physical server connects with the computing device via a network;

in response to receiving the request for the benefits usage summary recommendation report:

providing the demographic information and the standardized policy information identifying the different benefit coverages to a first machine learning model;

analyzing the demographic information and the standardized policy information identifying the different benefit coverages using the first machine learning model in substantially real-time to output a first benefits utilization prediction, the first machine learning model being trained using first training data formatted according to the standard schema and including the standardized coverage descriptions, wherein the first machine learning model is configured to analyze the demographic information and the standardized policy information identifying the different benefit coverages associated with the user in substantially real-time and to identify benefits that are currently available to the user under the existing policies that have already been issued to the user but have not been utilized or have not been fully utilized by the user;

providing the first benefits utilization prediction as an input to a recommendation engine;

automatically generating, using the recommendation engine, a benefits usage summary recommendation report message including information regarding one or more benefits currently available to the user based on the first benefits utilization prediction, the benefits usage summary recommendation report message including information of one or more benefits currently available to but have not been utilized or have not been fully utilized by the user and information in the standardized policy information describing the one or more benefits;

sending the benefits usage summary recommendation report message via the network in substantially real-time to the computing device associated with the user; and causing a user interface of the computing device associated with the user to present the benefits usage summary recommendation report message.

14. The machine-readable storage medium of claim 13, wherein the prediction that the one or more benefits are currently available to the user indicates that one or more prescriptions prescribed to the user may be obtained at a cheaper price at an alternative pharmacy.

15. The machine-readable storage medium of claim 13, wherein the prediction that the one or more benefits are currently available to the user indicates that the user could have saved a first amount on a first claim had the first claim been submitted to an in-network provider, and wherein the existing insurance policies include a medical insurance policy, a dental insurance policy, an accident insurance policy, a disability insurance policy, a critical illness insurance policy, an auto insurance policy, a hospital indemnity insurance policy, or a combination thereof.

16. The machine-readable storage medium of claim 13, wherein the prediction that the one or more benefits are currently available to the user includes a prediction of consumption of funds of a health savings account associated with the user, and wherein the third authentication pipeline provides two-factor authentication.

17. The machine-readable storage medium of claim 13, wherein the prediction that the one or more benefits are currently available to the user includes a prediction of an amount owed by the user for one or more insurance claims.

18. The machine-readable storage medium of claim 13, wherein the prediction that the one or more benefits are currently available to the user includes a prediction that one or more no cost or low-cost benefits are currently available and have not been used by the user.

19. The data processing system of claim 1, wherein the machine-readable medium includes instructions configured to cause the processor to perform an operation of:

generating standardized claims information from the claims information by:

converting the claims information from a third format used by an insurance provider to the first format associated with the standard schema;

mapping claim descriptions of the claims information to standardized claims descriptions by performing the probabilistic data match between the claims descriptions and the standardized claims descriptions, and for each respective claim description, selecting a respective standardized claim description having a highest probability of matching the respective claim description, and wherein the first training data used to train the first machine learning model includes the standardized claims descriptions.

* * * * *